United States Patent
Block et al.

(10) Patent No.: US 12,358,610 B1
(45) Date of Patent: Jul. 15, 2025

(54) MECHANISM FOR MOVING AND MAINTAINING POSITION OF AN AIRCRAFT WING SLAT

(71) Applicant: The Boeing Company, Arlington, VA (US)

(72) Inventors: Samuel Block, Bothell, WA (US); Ramón Burin, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/733,395

(22) Filed: Jun. 4, 2024

(51) Int. Cl.
    *B64C 13/28* (2006.01)
(52) U.S. Cl.
    CPC .................... *B64C 13/28* (2013.01)
(58) Field of Classification Search
    CPC .. B64C 13/28; B64C 9/18; B64C 9/24; B64C 3/50
    See application file for complete search history.

(56) References Cited

U.S. PATENT DOCUMENTS

| | | | | |
|---|---|---|---|---|
| 4,669,687 A | * | 6/1987 | Rudolph | ................... B64C 9/18 244/215 |
| 12,179,919 B2 | * | 12/2024 | Rayner | ..................... B64C 9/22 |
| 2024/0174346 A1 | * | 5/2024 | Schlipf | ..................... B64C 9/16 |

* cited by examiner

*Primary Examiner* — Tye William Abell
(74) *Attorney, Agent, or Firm* — Hanley, Flight & Zimmerman, LLC

(57) ABSTRACT

A mechanism for moving an aircraft wing slat between a retracted position and a deployed position includes a rib, an arm, a first bar and a second bar. The arm is disposed generally parallel with the rib and is configured for attachment with the wing slat. The rib, the arm and the first and second bars cooperate to form a four-bar linkage which is rotatable about connection points in a negative pitch rotational direction to dispose the arm in the deployed position, and in a positive pitch rotational direction to disposing the arm in the retracted position. The mechanism includes additional structures for maintaining the arm in the deployed position, including a magnetic extend stop and a standoff, an arm lobe and a cross-bolt, and a bar lobe and a linear member.

10 Claims, 24 Drawing Sheets

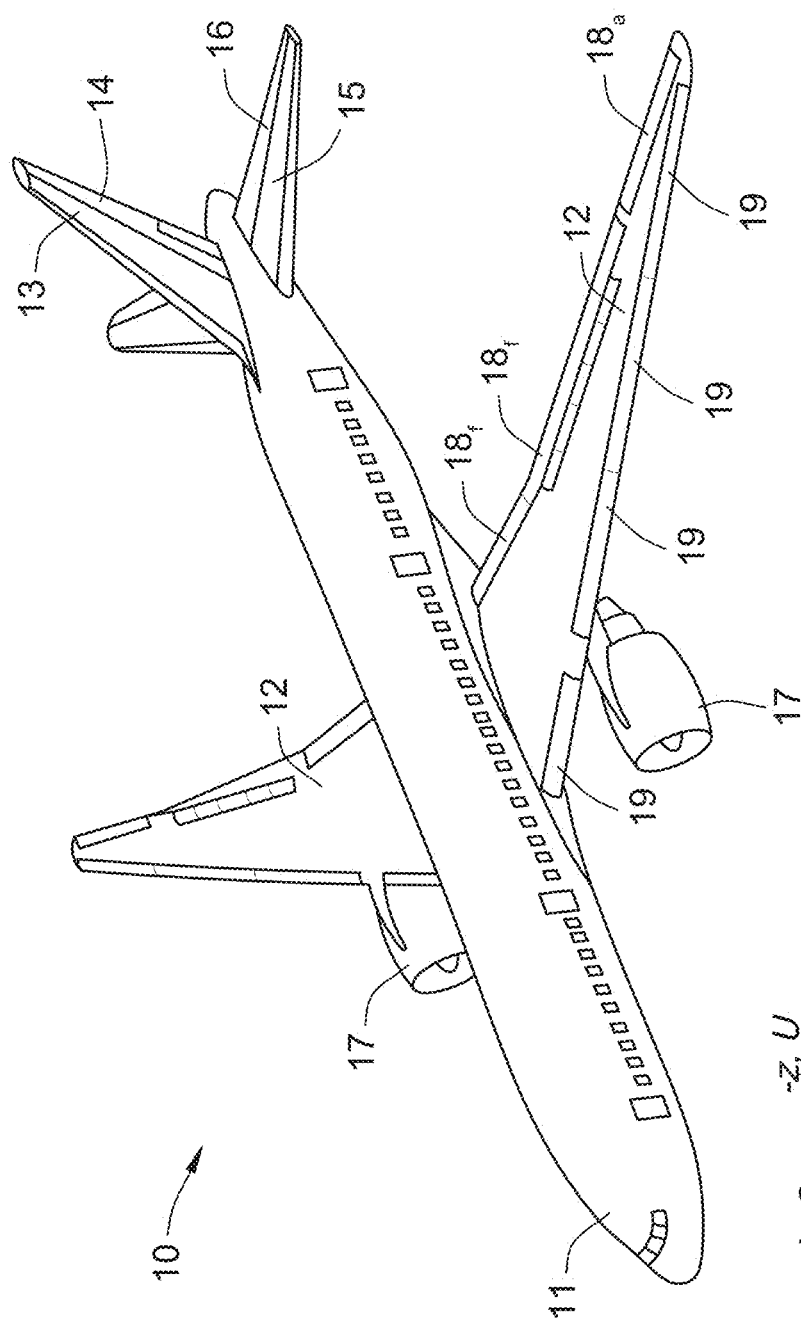
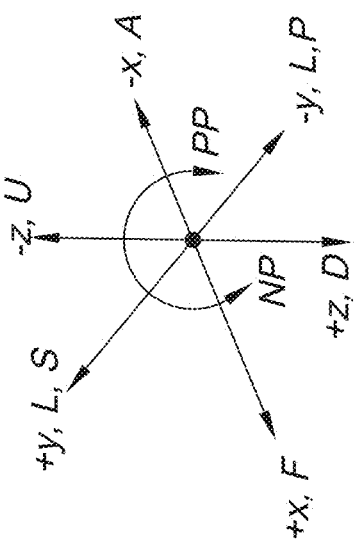
FIG. 1

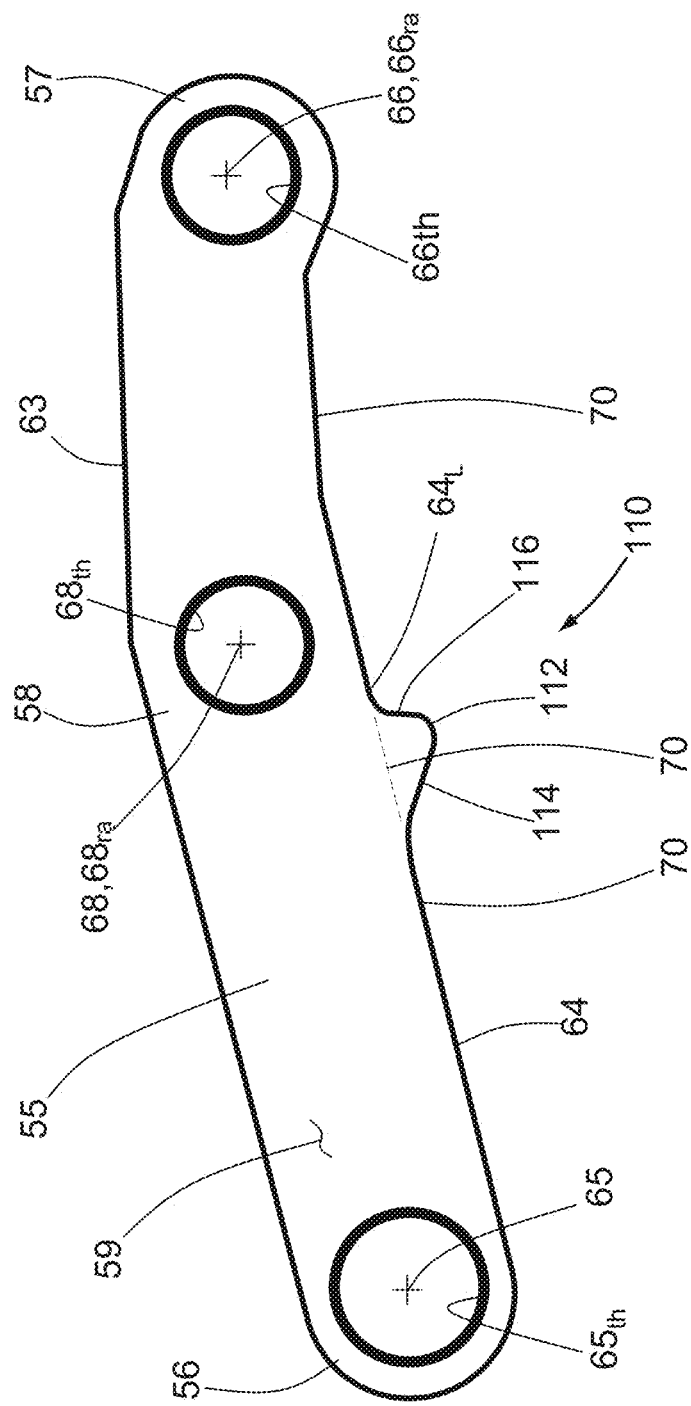
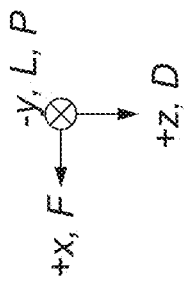
FIG. 16

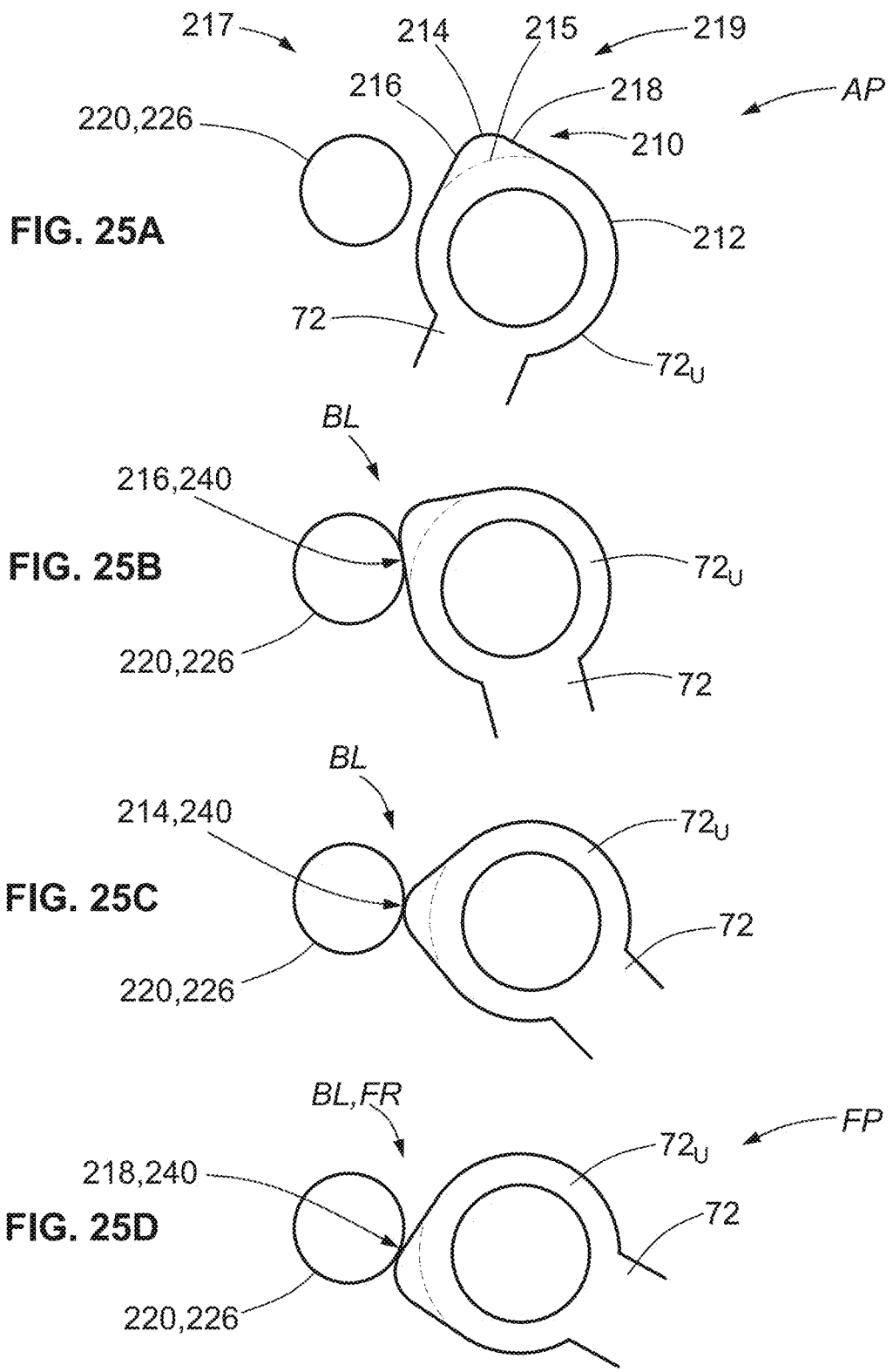

MECHANISM FOR MOVING AND MAINTAINING POSITION OF AN AIRCRAFT WING SLAT

This invention was made with government support under contract number 80AFRC22N0008 awarded by NASA. The government has certain rights in the invention.

INTRODUCTION

This disclosure relates to mechanisms for moving an aircraft wing slat between a retracted position and a deployed position, and more particularly to mechanisms which also maintain the aircraft wing slat in the deployed position.

Fixed-wing aircraft typically include a variety of movable flight control surfaces. These surfaces include a rudder on the trailing edge of the vertical stabilizer for steering to port and starboard, elevators on the trailing edge of wings for controlling pitch, and ailerons on the trailing edge of wings for controlling roll. The aircraft may also include extendable slats on the leading edge of the wings for increasing lift during certain low speed operations such as takeoff, initial climb, approach and landing.

When slats are extended, they are moved outward and downward from the leading edge of the wing into a deployed position by a mechanism. However, air resistance during flight exerts an aftward force against the slats, which in turn is exerted against the mechanism, making it harder for the mechanism to maintain the slats in the deployed position.

SUMMARY

According to one embodiment, a mechanism for moving a slat of an aircraft wing of an aircraft, wherein the aircraft defines forward, aftward, upward, downward and lateral directions, includes: (i) a first rib having a first rib face on a first rib side, a forward first rib connection point on the first rib side and an aftward first rib connection point on the first rib side; (ii) a generally elongate arm disposed generally parallel with the first rib on the first rib side, the arm having a first arm face on a first arm side facing the first rib face, a forward arm connection point at a forward arm end, a first aftward arm connection point on the first arm side at an aftward arm end, and a first middle arm connection point on the first arm side at a middle arm portion between the forward and aftward arm ends; (iii) a first bar having a first bar upper end rotatably attached to the arm at the first middle arm connection point and a first bar lower end rotatably attached to the first rib at the forward first rib connection point; (iv) a second bar having a second bar upper end rotatably attached to the arm at the first aftward arm connection point and a second bar lower end rotatably attached to the first rib at the aftward first rib connection point; (v) a first extend stop disposed on the first rib face; and (vi) a first standoff disposed on the first arm face. The first rib, the arm and the first and second bars cooperate to form a first four-bar linkage, wherein the first and second bars are rotatable about their respective forward and aftward first rib connection points in a negative pitch rotational direction until the first standoff contacts the first extend stop, thereby disposing the arm in a deployed position, and in a positive pitch rotational direction until the first standoff is moved away from the first extend stop by a first predetermined amount, thereby disposing the arm in a retracted position, wherein one of the first extend stop and the first standoff is magnetic, and the other of the first extend stop and the first standoff is magnetic or ferromagnetic.

Magnetic attraction between the first extend stop and the first standoff in the deployed position may urge the arm to remain in the deployed position.

The mechanism may further include an aircraft wing slat attached to the forward arm connection point.

The first extend stop may be magnetic and may have a first polarity, and the first standoff may be magnetic and may have a second polarity that is opposite the first polarity. Alternatively, one of the first extend stop and the first standoff may be magnetic, and the other of the first extend stop and the first standoff may be ferromagnetic.

At least one of the first middle arm connection point and the first aftward arm connection point may be a circular boss protruding outward from the first arm face, and at least one of the first bar upper end and the second bar upper end may be a circular dog bone end. Additionally or alternatively, at least one of the forward first rib connection point and the aftward first rib connection point may be a circular boss protruding outward from the first rib face, and at least one of the first bar lower end and the second bar lower end may be a circular dog bone end.

At least one of the first middle arm connection point and the first aftward arm connection point may be a circular through-hole extending through the arm and may have a respective cross-member disposed therethrough. Additionally or alternatively, at least one of the forward first rib connection point and the aftward first rib connection point may be a circular through-hole extending through the first rib and may have a respective cross-member disposed therethrough.

The arm may have a second arm face on a second arm side opposite the first arm side, a second aftward arm connection point on the second arm side at the aftward arm end, and a second middle arm connection point on the second arm side at the middle arm portion, and the mechanism may further include: (vii) a second rib having a second rib face on a second rib side, a forward second rib connection point on the second rib side and an aftward second rib connection point on the second rib side, wherein the second rib face faces toward the first rib face and the arm is disposed between the first and second ribs; (viii) a third bar having a third bar upper end rotatably attached to the arm at the second middle arm connection point and a third bar lower end rotatably attached to the second rib at the forward second rib connection point; and (ix) a fourth bar having a fourth bar upper end rotatably attached to the arm at the second aftward arm connection point and a fourth bar lower end rotatably attached to the second rib at the aftward second rib connection point. In this arrangement, the second rib, the arm and the third and fourth bars may cooperate to form a second four-bar linkage, wherein the third and fourth bars are rotatable about their respective forward and aftward second rib connection points in the negative and positive pitch rotational directions in concert with the first four-bar linkage.

According to another embodiment, a mechanism for moving a slat of an aircraft wing of an aircraft, wherein the aircraft defines forward, aftward, upward, downward and lateral directions, includes: (i) a first rib having a first rib face on a first rib side, an outer first rib face on an outer first rib side opposite the first rib side, a forward first rib connection point on the first rib side, an aftward first rib connection point on the first rib side, an outer first rib connection point on the outer first rib side, and a first rib opening extending through the first rib; (ii) a second rib having a second rib face on a second rib side, an outer second rib face on an outer second rib side opposite the second rib side, a forward second rib connection point on the second rib side, an aftward second rib connection point on the second rib side, an outer second rib connection point on the outer second rib side, and a second rib opening extending through second rib, wherein the second rib face faces toward and is generally parallel with the first rib face; (iii) a generally elongate arm disposed generally parallel with and between the first and second ribs, the arm having a first arm face on a first arm side facing the first rib face, a second arm face on a second arm side facing the second rib face, a bottom arm face, a forward arm connection point at a forward arm end, a first aftward arm connection point on the first arm side at an aftward arm end, a second aftward arm connection point on the second arm side at the aftward arm end, a first middle arm connection point on the first arm side at a middle arm portion between the forward and aftward arm ends, a second middle arm connection point on the second arm side at the middle arm portion, and an arm lobe extending downward from the bottom arm face and having an arm lobe peak, a forward ramp surface forward of the arm lobe peak and an aftward ramp surface aftward of the arm lobe peak, wherein the bottom arm face has a landing portion thereof adjacent the aftward ramp surface; (iv) a first bar having a first bar upper end rotatably attached to the arm at the first middle arm connection point and a first bar lower end rotatably attached to the first rib at the forward first rib connection point; (v) a second bar having a second bar upper end rotatably attached to the arm at the first aftward arm connection point and a second bar lower end rotatably attached to the first rib at the aftward first rib connection point; (vi) a third bar having a third bar upper end rotatably attached to the arm at the second middle arm connection point and a third bar lower end rotatably attached to the second rib at the forward second rib connection point; (vii) a fourth bar having a fourth bar upper end rotatably attached to the arm at the second aftward arm connection point and a fourth bar lower end rotatably attached to the second rib at the aftward second rib connection point; (viii) a cross-bolt having a first cross-bolt end extending through the first rib opening, a second cross-bolt end extending through the second rib opening and an outer cross-bolt surface between the first and second cross-bolt ends; (ix) a first biasing member having a first biasing member upper end attached to the outer first rib connection point and a first biasing member lower end attached to the first cross-bolt end; and (x) a second biasing member having a second biasing member upper end attached to the outer second rib connection point and a second biasing member lower end attached to the second cross-bolt end. The first rib, the arm and the first and second bars cooperate to form a first four-bar linkage and the second rib, the arm and the third and fourth bars cooperate to form a second four-bar linkage, wherein the first and second bars are rotatable about their respective forward and aftward first rib connection points and the third and fourth bars are rotatable about their respective forward and aftward second rib connection points in a negative pitch rotational direction until the outer cross-bolt surface successively contacts the forward ramp surface, the arm lobe peak, the aftward ramp surface and the landing portion, thereby disposing the arm in an extended position, and in a positive pitch rotational direction until the outer cross-bolt surface successively contacts the landing portion, the aftward ramp surface, the arm lobe peak and the forward ramp surface, thereby disposing the arm in a default position.

Frictional resistance between the outer cross-bolt surface and the aftward ramp surface in the extended position may urge the arm to remain in the extended position. Movement of the arm from the default position to the extended position may cause the first and second biasing members to extend as the outer cross-bolt surface successively contacts the forward ramp surface and the arm lobe peak and to retract as the outer cross-bolt surface successively contacts the aftward ramp surface and the landing portion.

According to yet another embodiment, a mechanism for moving a slat of an aircraft wing of an aircraft, wherein the aircraft defines forward, aftward, upward, downward and lateral directions, includes: (i) a first rib having a first rib face on a first rib side, a forward first rib connection point on the first rib side and an aftward first rib connection point on the first rib side; (ii) a generally elongate arm disposed generally parallel with the first rib on the first rib side, the arm having a first arm face on a first arm side facing the first rib face, a forward arm connection point at a forward arm end, a first aftward arm connection point on the first arm side at an aftward arm end, and a first middle arm connection point on the first arm side at a middle arm portion between the forward and aftward arm ends; (iii) a first bar having a first bar upper end rotatably attached to the arm at the first middle arm connection point and a first bar lower end rotatably attached to the first rib at the forward first rib connection point; (iv) a second bar having a second bar upper end rotatably attached to the arm at the first aftward arm connection point and a second bar lower end rotatably attached to the first rib at the aftward first rib connection point; (v) a bar lobe extending radially outward from a circumferential cam surface on the first bar upper end or the second bar upper end, wherein the circumferential cam surface defines a rotationally forward negative pitch rotational direction and a rotationally aftward positive pitch rotational direction, and wherein the bar lobe has a bar lobe peak, a first ramp surface on a rotationally forward side of the bar lobe peak and a second ramp surface on a rotationally aftward side of the bar lobe peak; and (vi) a linear member disposed at least partially on the first arm side and having a first linear member end extending outward from the first arm face and an outer linear member surface adjacent the first linear member end. The first rib, the arm and the first and second bars cooperate to form a first four-bar linkage, wherein the first and second bars are rotatable about their respective forward and aftward first rib connection points in the negative pitch rotational direction until the outer linear member surface successively contacts the first ramp surface, the bar lobe peak and the second ramp surface, thereby disposing the arm in a forward position, and in the positive pitch rotational direction until the outer linear member surface successively contacts the second ramp surface, the bar lobe peak and the first ramp surface, thereby disposing the arm in an aftward position.

Frictional resistance between the outer linear member surface and the second ramp surface in the forward position may urge the arm to remain in the forward position.

Movement of the arm from the aftward position to the forward position may exert a bending load on the linear member as the outer linear member surface successively contacts the first ramp surface, the bar lobe peak and the second ramp surface, and movement of the arm from the forward position to the aftward position may release the bending load from the linear member as the outer linear member surface successively contacts the second ramp surface, the bar lobe peak and the first ramp surface.

The mechanism may further include an aircraft wing slat attached to the forward arm connection point.

The arm may have a second arm face on a second arm side opposite the first arm side, a second aftward arm connection point on the second arm side at the aftward arm end, and a second middle arm connection point on the second arm side at the middle arm portion, with the mechanism further including: (vii) a second rib having a second rib face on a second rib side, a forward second rib connection point on the second rib side and an aftward second rib connection point on the second rib side, wherein the second rib face faces toward the first rib face and the arm is disposed between the first and second ribs; (viii) a third bar having a third bar upper end rotatably attached to the arm at the second middle arm connection point and a third bar lower end rotatably attached to the second rib at the forward second rib connection point; and (ix) a fourth bar having a fourth bar upper end rotatably attached to the arm at the second aftward arm connection point and a fourth bar lower end rotatably attached to the second rib at the aftward second rib connection point. In this arrangement, the second rib, the arm and the third and fourth bars may cooperate to form a second four-bar linkage, wherein the third and fourth bars are rotatable about their respective forward and aftward second rib connection points in the negative and positive pitch rotational directions in concert with the first four-bar linkage.

The arm may include an auxiliary arm through-hole and the linear member may extend through the auxiliary arm through-hole. The linear member may be further disposed at least partially on the second arm side and may have a second linear member end extending outward from the second arm face.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a schematic perspective view of an aircraft, along with various directions defined by the aircraft.

FIG. 16 is a side view of an arm according to the second embodiment, including an arm lobe.

FIGS. 25A-D are a sequence of schematic cross-sectional side views of a bar lobe on a bar making contact with a linear member.

DETAILED DESCRIPTION

Figure 2A:
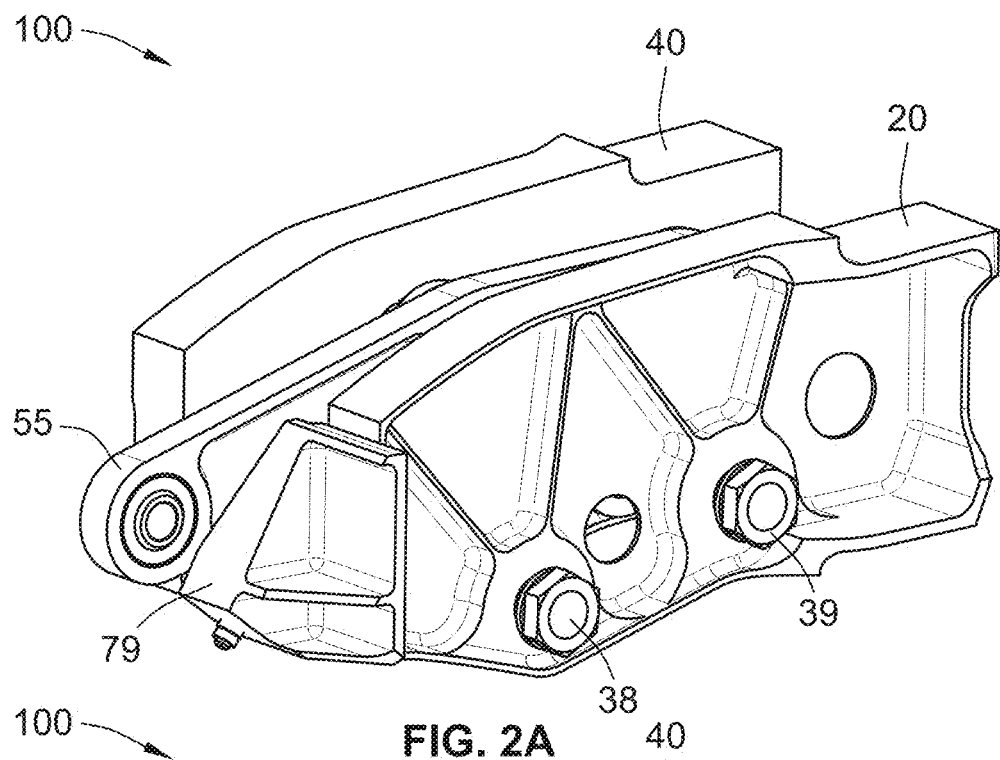
FIG. 2A is a perspective view of a mechanism according to a first embodiment.

Referring now to the drawings, wherein like numerals indicate like parts in the several views, multiple embodiments of a mechanism 100, 200, 300 for moving an aircraft wing slat 19 are shown and described herein.

FIG. 1 shows a schematic perspective view of an aircraft 10, along with various directions defined by the aircraft 10.

The aircraft 10 includes a fuselage 11, two opposed wings 12 on either side of the fuselage 11, a vertical stabilizer 13 with a rudder 14, two opposed horizontal stabilizers 15 with elevators 16, one or more engines 17, at least one aileron 18a at the distal end of each wing 12, and one or more flaps 18f on each wing 12 inboard of the ailerons 18a.

Note that a customary x-y-z coordinate system which follows the right-hand rule is shown in FIG. 1 and throughout the drawings. This coordinate system and its related spatial directions are defined by the layout of the aircraft 10 and its components. For example, the fuselage 11 points from tail to nose in a forward direction F, which is aligned with the positive x-direction (+x), and from nose to tail in an aftward direction A, which is aligned with the negative x-direction (−x). The wings 12 extend outward from the fuselage 11 in a slightly aftward direction A, but also in a lateral direction L that is perpendicular to the forward and aftward directions F, A. Using the forward direction F as a reference, the lateral direction L extends to the right in a starboard direction S, which is aligned with a positive y-direction (+y), and to the left in a port direction P, which is aligned with a negative y-direction (−y). Following the aforementioned right-hand rule convention, a downward direction D is aligned with a positive z-direction (+z), and an upward direction U is aligned with a negative z-direction (−z). Thus, with respect to the aircraft 10 and its center of mass, a "roll" rotational direction is defined about a longitudinal axis that runs through the aircraft's center of mass and along the fuselage 11 in the forward and aftward directions F, A (i.e., in the +x and −x directions), a "pitch" rotational direction is defined about a transverse or lateral axis that runs through the center of mass and along the lateral directions L (i.e., in the +y/starboard and −y/port directions S, P), and a "yaw" rotational direction is defined about a vertical axis that runs through the center of mass and along the downward and upward directions D, U (i.e., in the +z and −z directions). As indicated by the coordinate system shown in FIG. 1, a negative pitch rotational direction NP is defined about the transverse or lateral axis when the aircraft 10 dives in a "nose down, tail up" rotational direction, and a positive pitch rotational direction PP is defined about the transverse or lateral axis when the aircraft 10 climbs in a "nose up, tail down" rotational direction.

FIGS. 2-29 show various views of three different but related embodiments of a mechanism 100, 200, 300 for moving an aircraft wing slat 19 between a retracted position RP and a deployed position DP according to the present disclosure. In each of these embodiments, the mechanism 100, 200, 300 includes at least a first rib 20, a generally elongate arm 55, and at least two connecting bars 71, 72. The arm 55 is disposed generally parallel with the first rib 20 and is configured for attachment with the aircraft wing slat 19. The first rib 20, the arm 55 and the first and second bars 71, 72 cooperate with each other to form a first four-bar linkage 98 which is rotatable about certain connection points 29, 30 in a negative pitch rotational direction NP to dispose the arm 55 in the deployed position DP, and in a positive pitch rotational direction PP to disposing the arm 55 in the retracted position RP.

The mechanism 100, 200, 300 includes additional structures for maintaining the arm 55 in the deployed position DP. For example, in the first embodiment, the mechanism 100 includes a first extend stop 80 and a first standoff 84, with one or both of these additional structures being magnetic M. In the second embodiment, the mechanism 200 includes an arm lobe 110 extending outward and downward from the bottom of the arm 55 and a stationary cross-bolt 120 with which the arm lobe 110 makes contact when the arm 55 is moved into the deployed position DP. And in the third embodiment, the mechanism 300 includes a bar lobe 210 extending radially outward from an upper end of one of the bars 71, 72 and a linear member 220 against which the bar lobe 210 exerts a bending load BL when the arm 55 is moved into the deployed position DP. Each of these three embodiments are described in detail below.

Note that as used herein, reference number "DP" and the phrase "deployed position" may signify the deployed position of the arm 55 (and of an attached wing slat 19) in the first embodiment specifically, but may also be used more generally to indicate a similar position of the arm 55 (and an attached wing slat 19) in the second embodiment (where the "deployed position" may also be referred to as an "extended position" EP) and in the third embodiment (where the "deployed position" may also be referred to as a "forward position" FP). Similarly, reference number "RP" and the phrase "retracted position" may signify the retracted position of the arm 55 (and of an attached wing slat 19) in the first embodiment specifically, but may also be used more generally to indicate a similar position of the arm 55 (and an attached wing slat 19) in the second embodiment (where the "retracted position" may also be referred to as a "default position" XP) and in the third embodiment (where the "retracted position" may also be referred to as an "aftward position" AP). Although not shown in the drawings, the mechanism 100, 200, 300 may be moved back-and-forth between the retracted position RP and the deployed position DP by an electric, hydraulic, pneumatic and/or mechanical device that is connected directly or indirectly to one or more components of the mechanism 100, 200, 300.

In contrast with the conventional approaches discussed in the INTRODUCTION section above, the mechanism 100, 200, 300 of the present disclosure solves the technical problem of preventing the arm 55 from being pushed out of the deployed position DP during flight because of air resistance by the technical effect of providing the additional structures introduced above for maintaining the arm 55 in the deployed position DP, thereby providing significant benefits and technical advantages which are not taught or suggested by the conventional approaches. These benefits and technical advantages include the use of structural elements and features which offer higher reliability and improved performance (e.g., in terms of maintaining the arm 55 in the deployed position DP during flight) as compared to previous approaches.

Returning now to the drawings, FIGS. 2A-11C show various views of the first embodiment of the mechanism 100, FIGS. 12A-19E show various views of the second embodiment of the mechanism 200, and FIGS. 20A-25D show various views of the third embodiment of the mechanism 300. Additionally, the block diagrams of FIGS. 26-29 illustrate how various arm connection points 66, 67, 68, 69 and various rib connection points 29, 30, 49, 50 may be: (i) circular bosses 35 coupled with circular dog bone ends 76, and/or (ii) through-holes 33, 34, 53, 54, $66_{th}$, $68_{th}$ coupled with corresponding cross-members 36, 37, 38, 39.

Figure 2B:
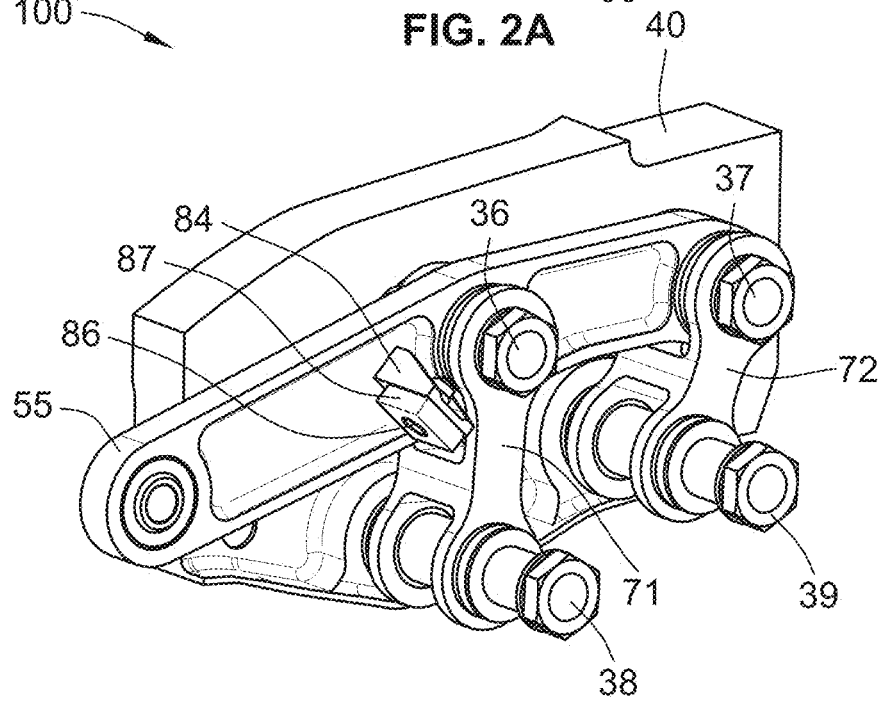
FIG. 2B is the same view as FIG. 2A but with the first rib removed.
Figure 3A:
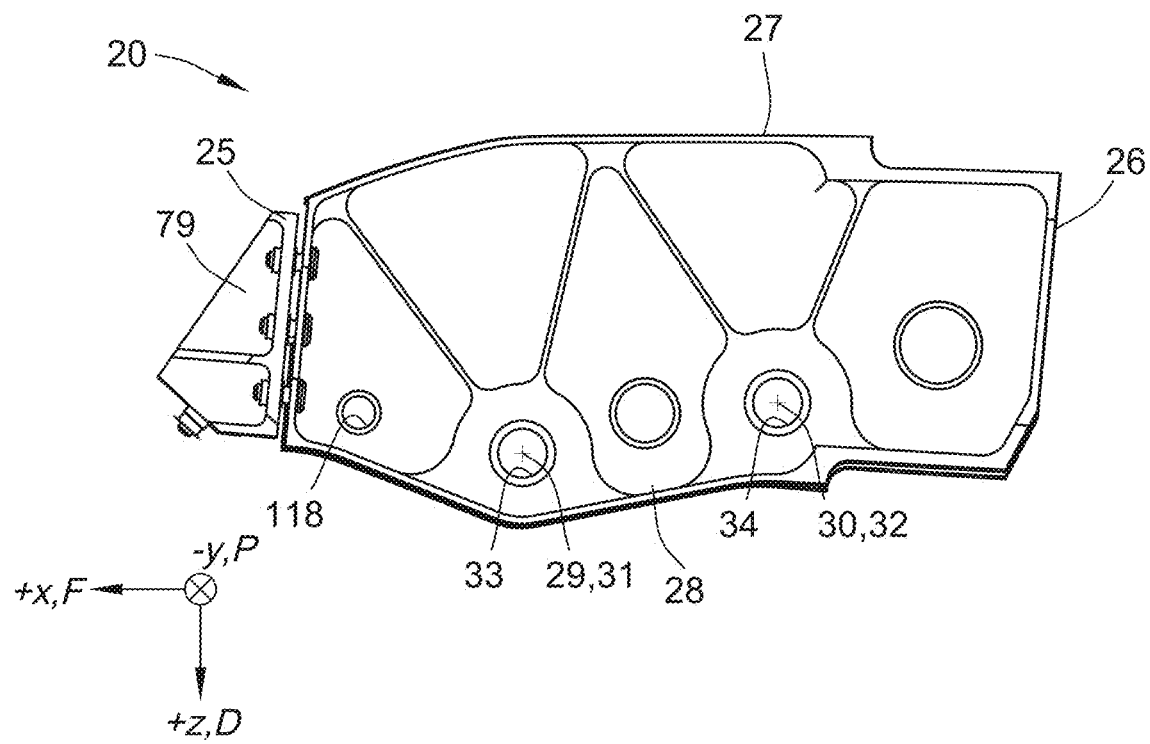
FIGS. 3A-B are side views of the first and second ribs, respectively, according to the first embodiment.
Figure 3B:
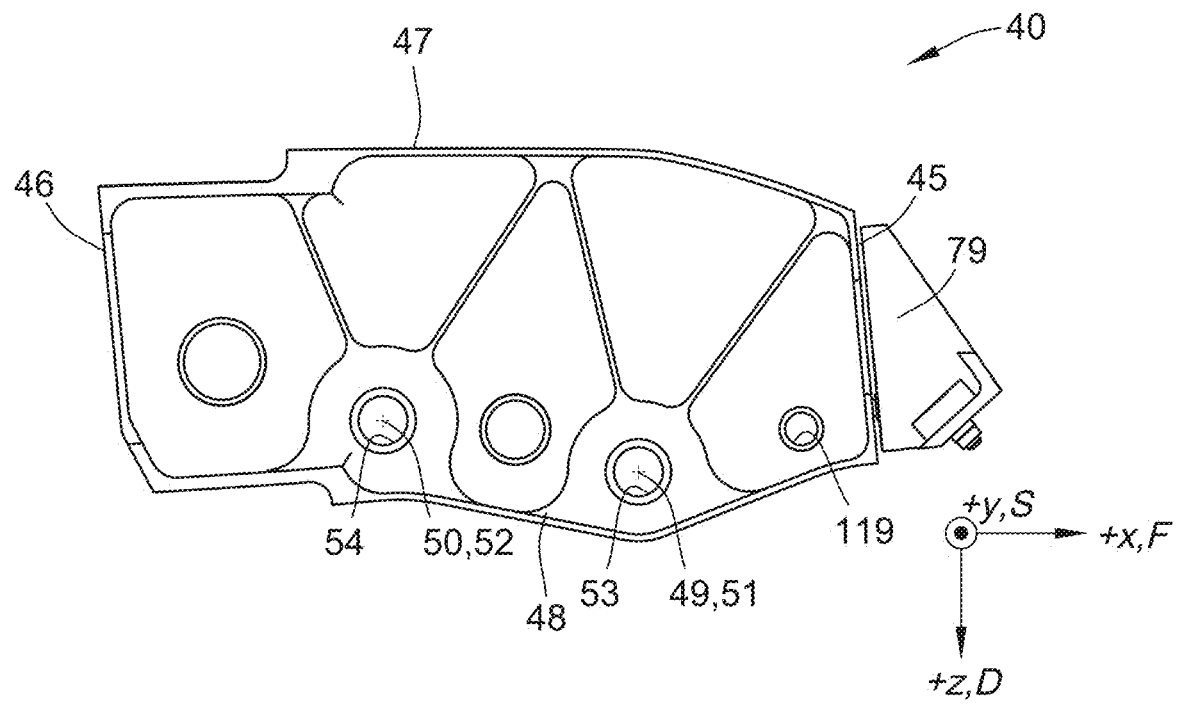
Figure 4:
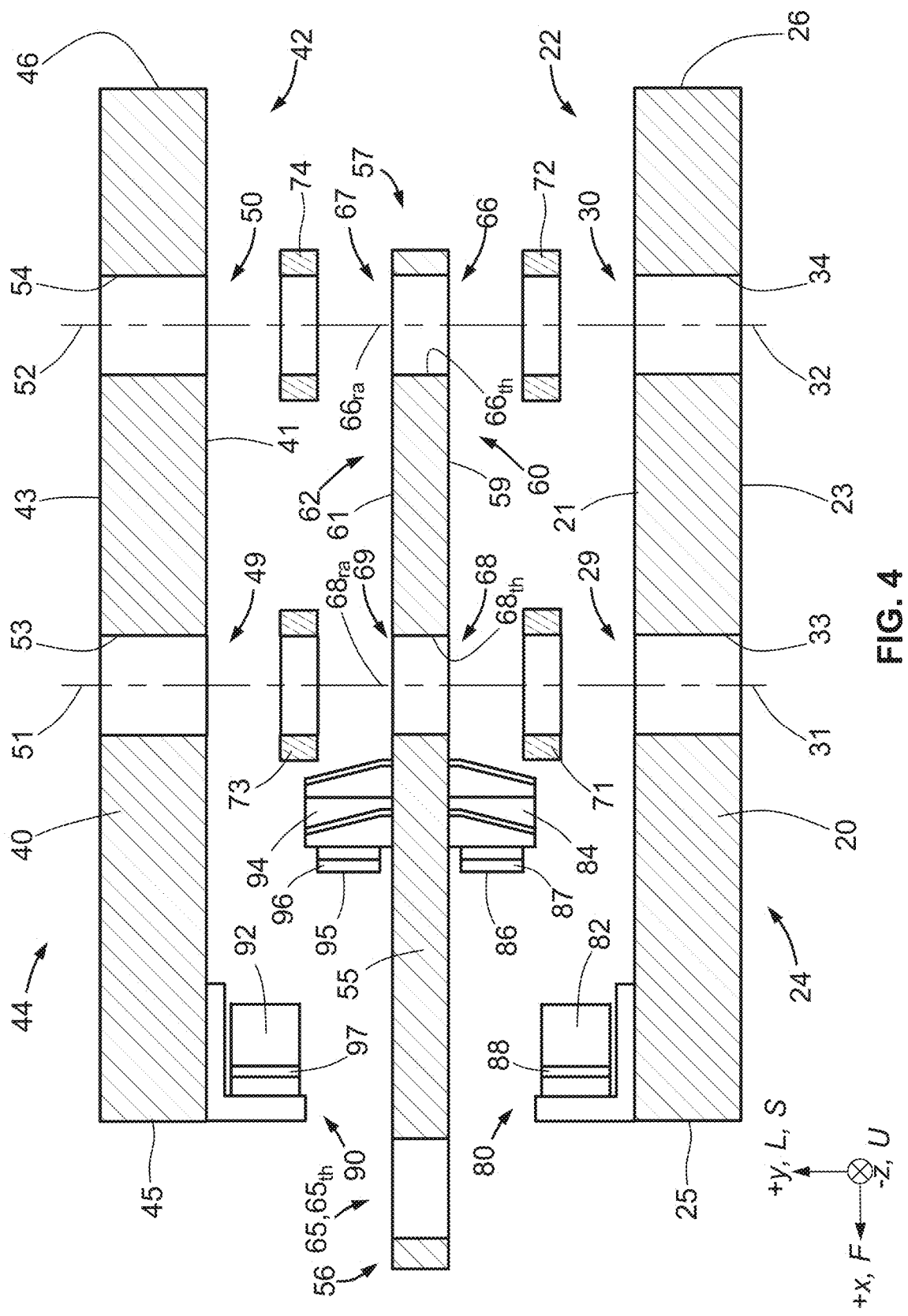
FIG. 4 is an exploded schematic top cross-sectional view of the mechanism according to the first embodiment, but with cross-members not shown.
Figure 5:
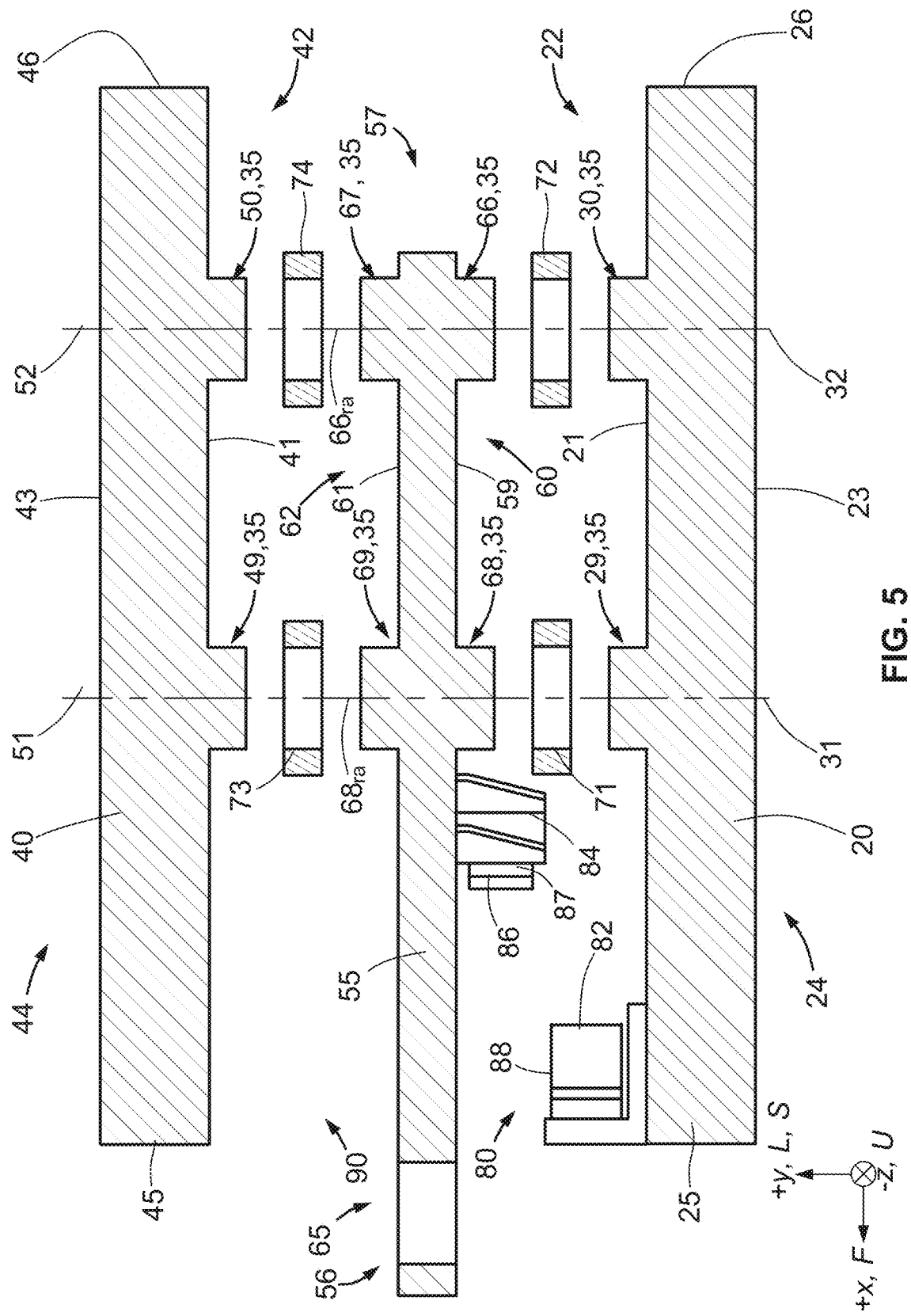
FIG. 5 is the same view as FIG. 4, but utilizing an alternative configuration of the mechanism according to the first embodiment.
Figure 6:
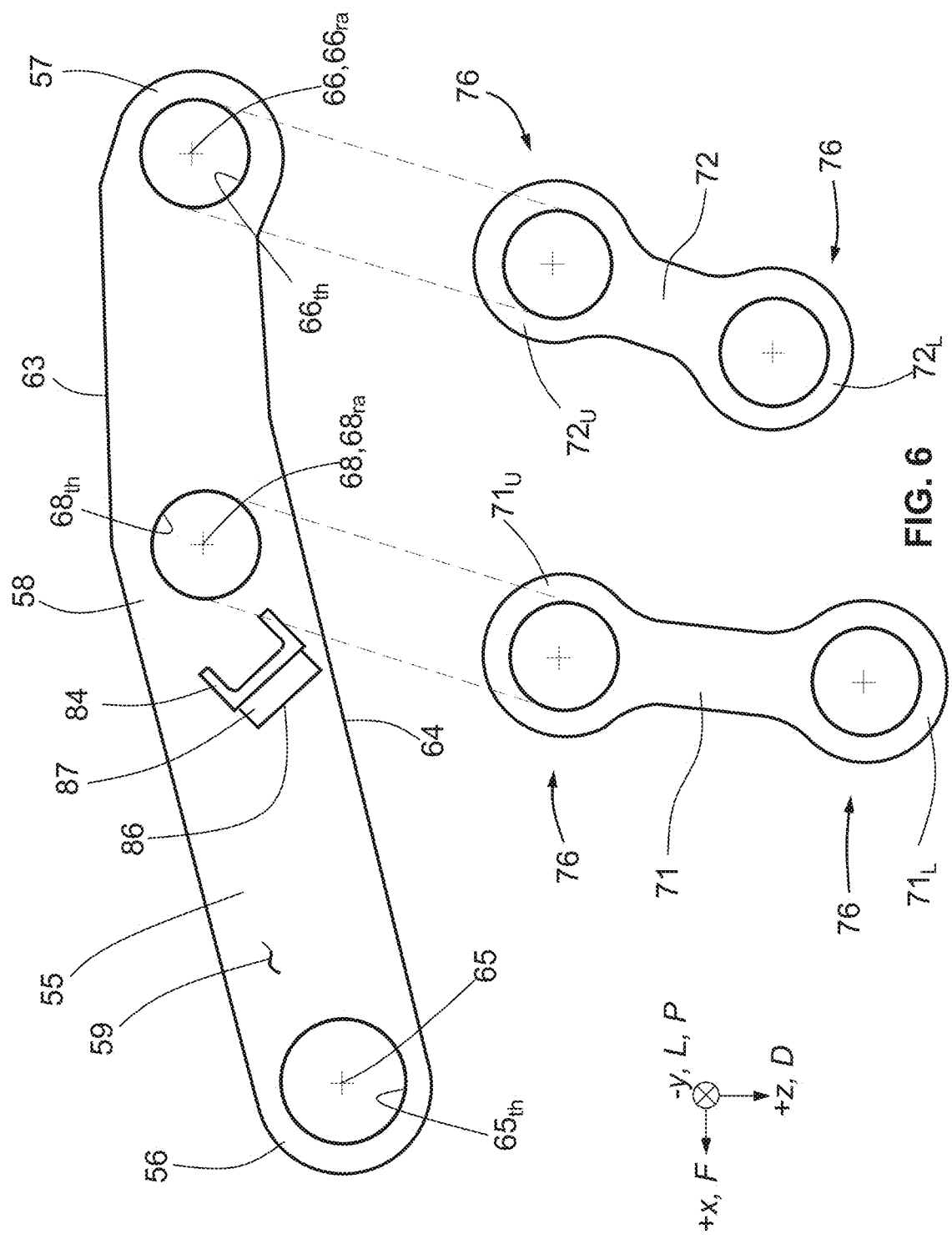
FIG. 6 is an exploded side view of the arm and the first and second bars according to the first embodiment.
Figure 7:
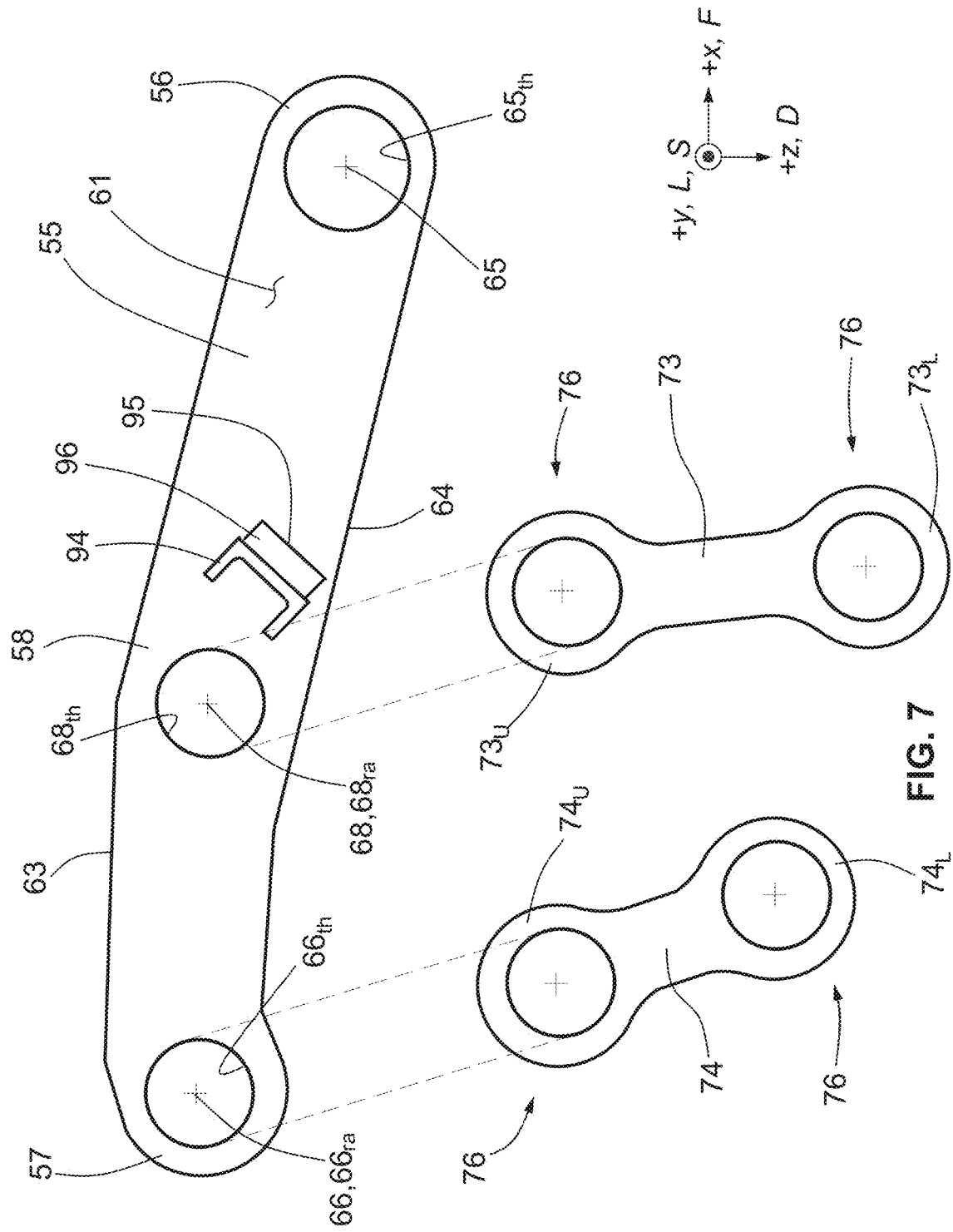
FIG. 7 is an exploded side view of the arm and the third and fourth bars according to the first embodiment.
Figure 8A:
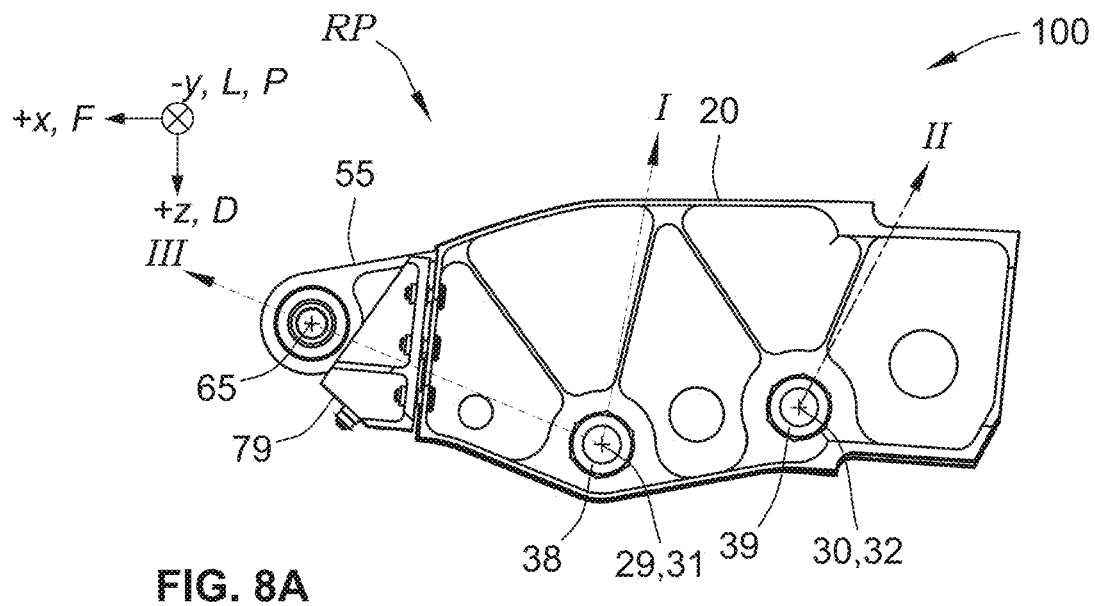
FIGS. 8A-C are side views of the mechanism according to the first embodiment, showing a retracted position, a position between the retracted position and a deployed position, and the deployed position, respectively.
Figure 8B:
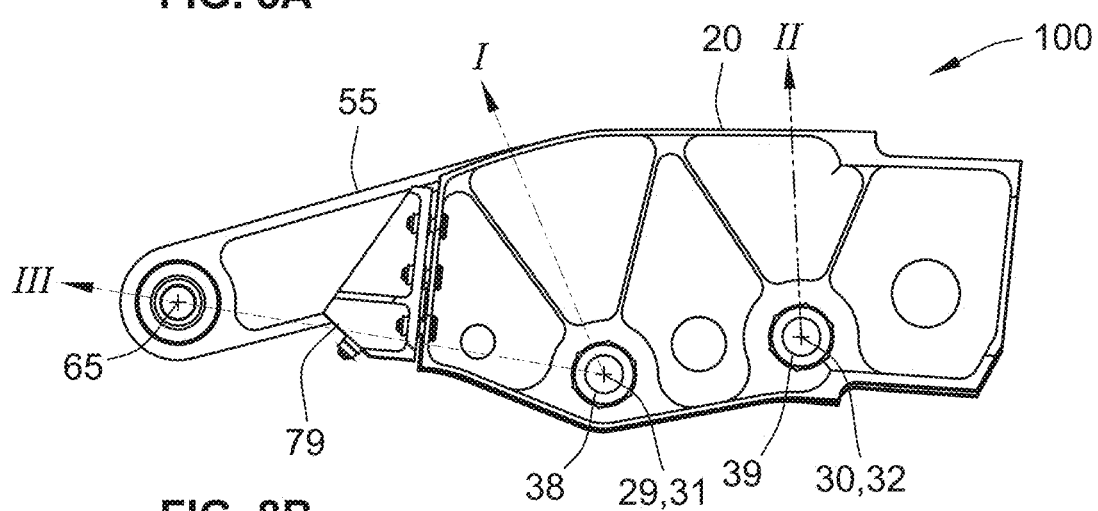
Figure 8C:
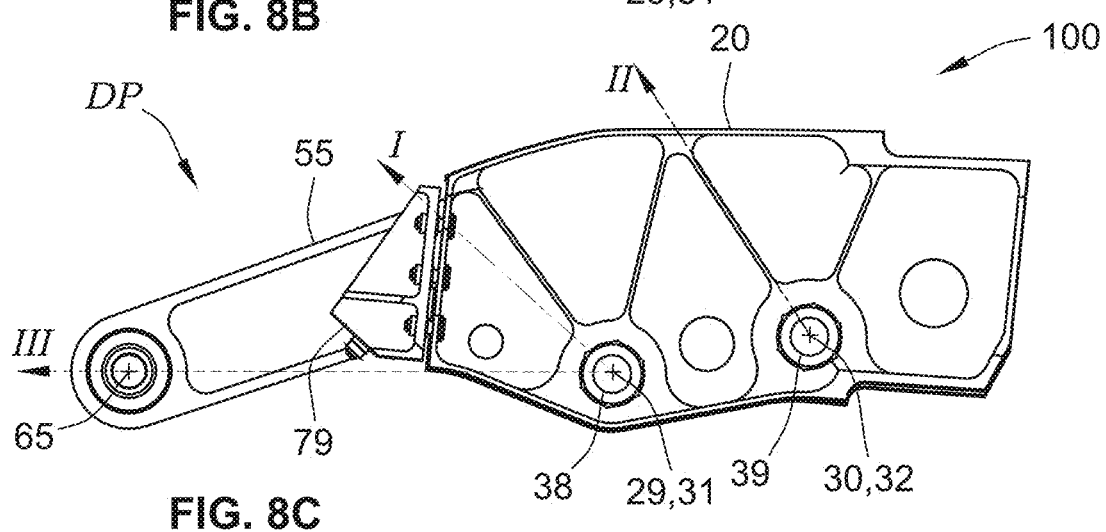
Figure 9A:
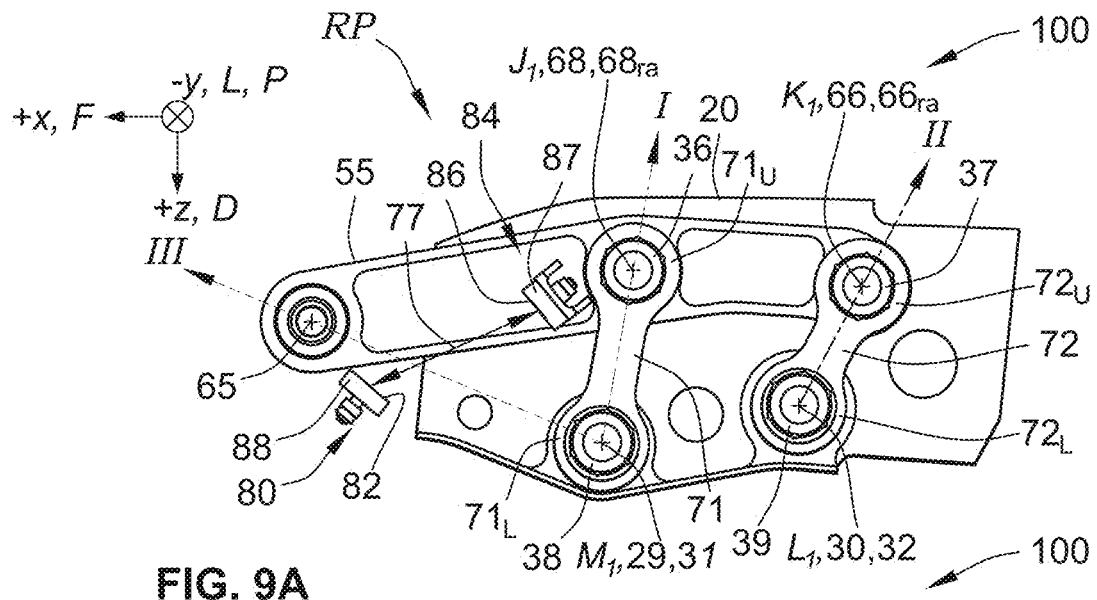
FIGS. 9A-C are the same views as FIGS. 8A-C, respectively, but with the first rib removed.
Figure 9B:
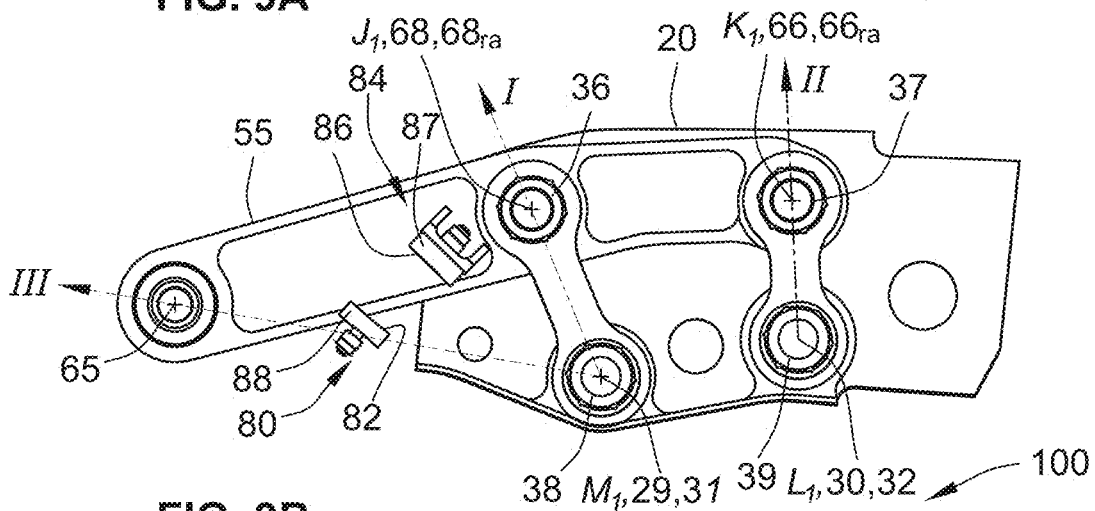
Figure 9C:
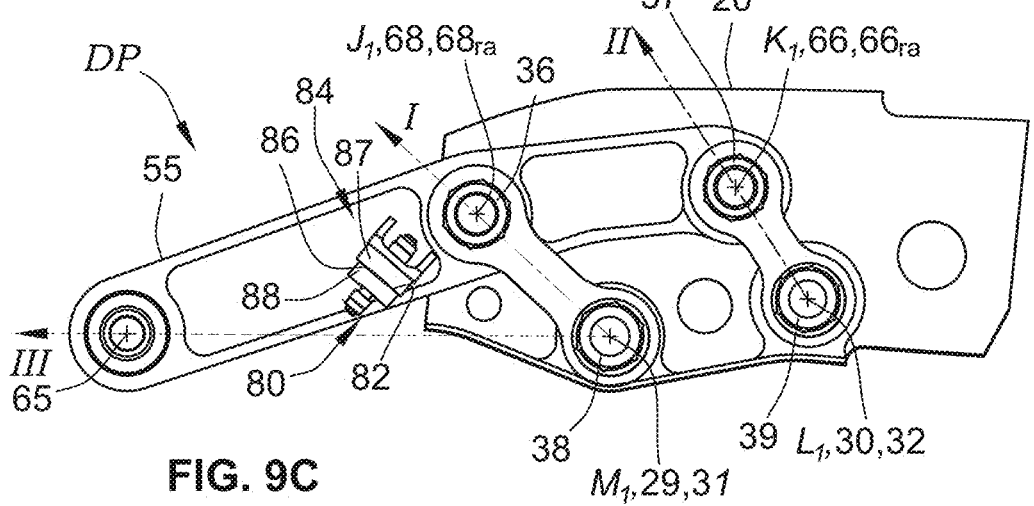
Figure 10A:
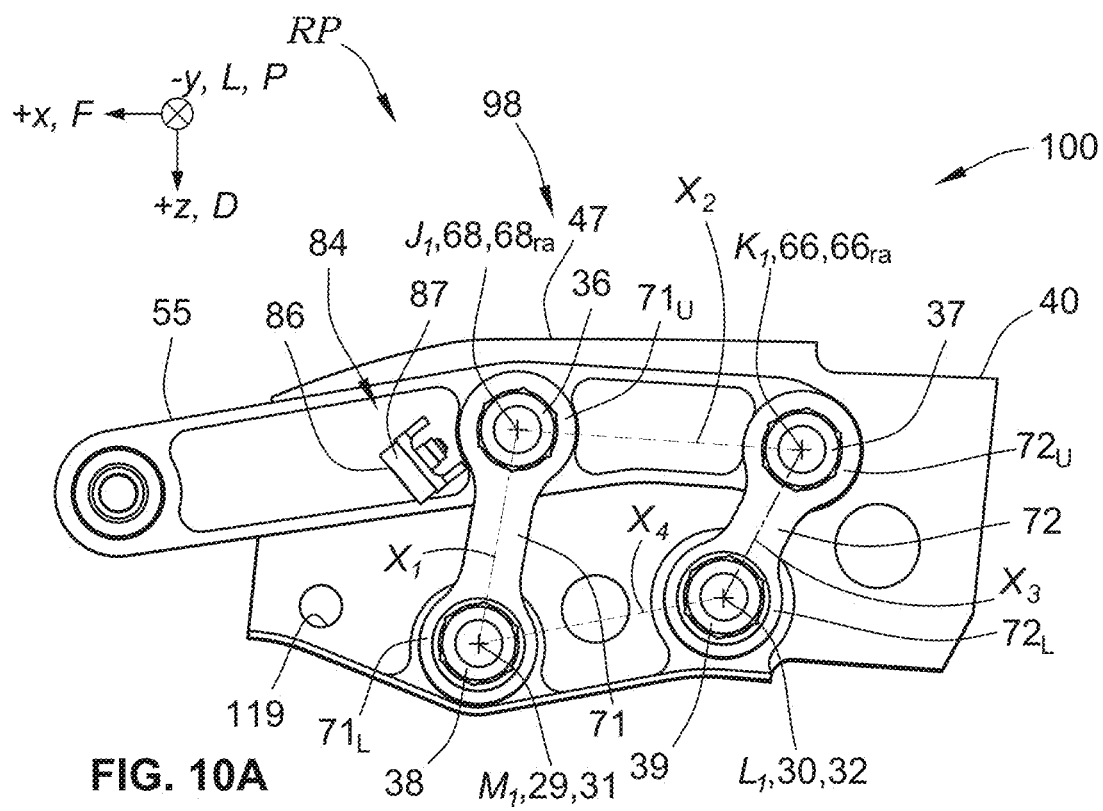
FIGS. 10A-B are side views of the mechanism according to the first embodiment, but with the first and second ribs removed, respectively.
Figure 10B:
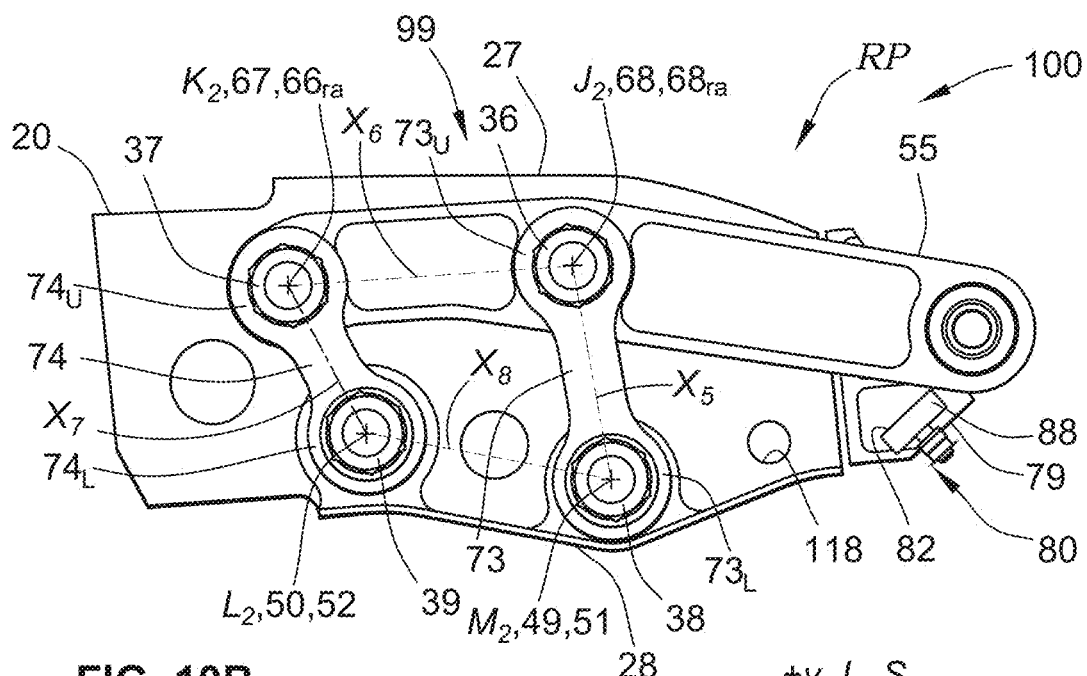
Figure 11A:
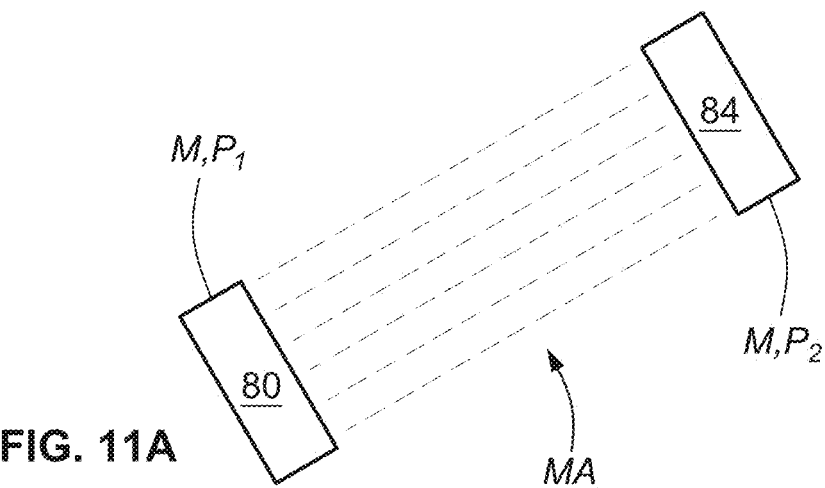
FIGS. 11A-C are schematic representations of the first extend stop and the first standoff, showing various configurations for providing magnetic attraction therebetween.
Figure 11B:
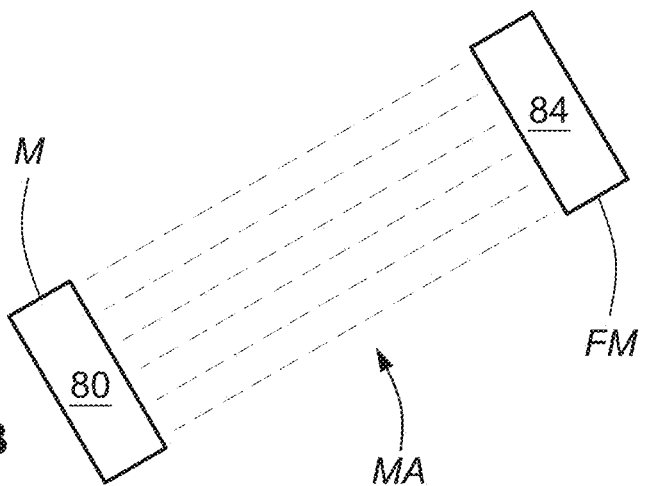
Figure 11C:
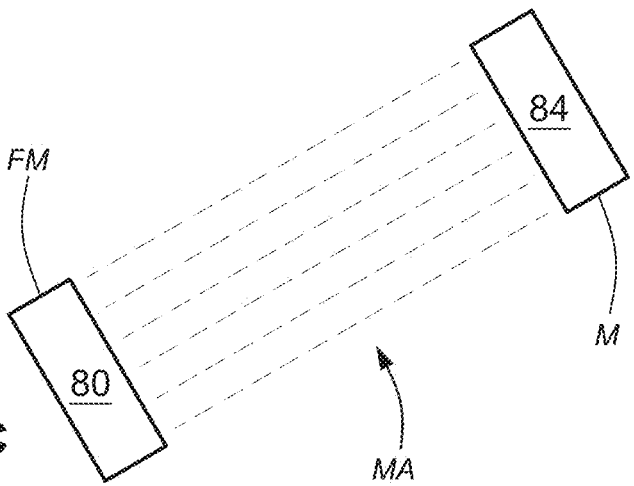

More specifically, and focusing on the first embodiment, FIG. 2A shows a perspective view of the mechanism 100 according to the first embodiment, and FIG. 2B shows the same view as FIG. 2A but with the first rib 20 removed. FIGS. 3A-B show side views of the first and second ribs 20, 40, respectively, and FIGS. 4-5 show exploded, schematic, top cross-sectional views of two different configurations of the mechanism 100, but with no cross-members shown. FIG. 6 shows an exploded side view of the arm 55 and the first and second bars 71, 72, and FIG. 7 shows an exploded side view of the arm 55 and the third and fourth bars 73, 74. FIGS. 8A-C show side views of the mechanism 100, showing a retracted position RP, a position between the retracted position RP and the deployed position DP, and the deployed position DP, respectively; FIGS. 9A-C show the same views as FIGS. 8A-C, respectively, but with the first rib 20 removed. FIGS. 10A-B show side views of the mechanism 100, but with the first rib 20 and second rib 40 removed, respectively. And FIGS. 11A-C show schematic representations of the first extend stop 80 and the first standoff 84, showing various configurations for providing magnetic attraction MA therebetween.

As noted above, the mechanism 100 includes a first rib 20, a generally elongate arm 55, and at least two connecting bars 71, 72.

The first rib 20 has a first rib face 21 on a first rib side 22, an outer first rib face 23 on an outer first rib side 24 opposite the first rib side 22, a forward first rib connection point 29 on the first rib side 22 and an aftward first rib connection point 30 also on the first rib side 22. The first rib 20 also has a first front face 25, a first back face 26, a first op face 27 and a first bottom face 28. The forward first rib connection point 29 has a forward first rib rotation axis 31, and the aftward first rib connection point 30 has an aftward first rib rotation axis 32.

The arm 55 is disposed generally parallel with the first rib 20 on the first rib side 22, and has a first arm face 59 on a first arm side 60 facing the first rib face 21, a top arm face 63, a bottom arm face 64, a forward arm connection point 65 at a forward arm end 56, a first aftward arm connection point 66 on the first arm side 60 at an aftward arm end 57, and a first middle arm connection point 68 on the first arm side 60 at a middle arm portion 58 between the forward and aftward arm ends 56, 57. The arm 55 also has a second arm face 61 on a second arm side 62 opposite the first arm side 60, a second aftward arm connection point 67 on the second arm side 62 at the aftward arm end 57, and a second middle arm connection point 69 on the second arm side 62 at the middle arm portion 58. The first aftward arm connection point 66 has an aftward arm rotation axis $66_{ra}$, and the first middle arm connection point 68 has a middle arm rotation axis $66_{ra}$. The second aftward arm connection point 67 also has a rotation axis which may be the same as the aftward arm rotation axis $66_{ra}$, and the second middle arm connection point 69 has a rotation axis which may be the same as the middle arm rotation axis $66_{ra}$. The forward arm connection point 65 at the forward arm end 56 may include a forward arm through-hole $65_{th}$ for connecting the arm 55 directly or indirectly to an aircraft wing slat 19.

The first bar 71 has a first bar upper end $71_U$ that is rotatably attached to the arm 55 at the first middle arm connection point 68, and a first bar lower end $71_L$ that is rotatably attached to the first rib 20 at the forward first rib connection point 29. Similarly, the second bar 72 has a second bar upper end $72_U$ rotatably attached to the arm 55 at the first aftward arm connection point 66, and a second bar lower end $72_L$ rotatably attached to the first rib 20 at the aftward first rib connection point 30.

The mechanism 100 may further include a second rib 40, a third bar 73 and a fourth bar 74.

The second rib 40 has a second rib face 41 on a second rib side 42, an outer second rib face 43 on an outer second rib side 44 opposite the second rib side 42, a forward second rib connection point 49 on the second rib side 42 and an aftward second rib connection point 50 on the second rib side 42, wherein the second rib face 41 faces toward the first rib face 21 and the arm 55 is disposed between the first and second ribs 20, 40. The second rib 40 also has a second front face 45, a second back face 46, a second top face 47 and a second bottom face 48. The forward second rib connection point 49 has a forward second rib rotation axis 51, and the aftward second rib connection point 50 has an aftward second rib rotation axis 52.

The third bar 73 has a third bar upper end $73_U$ rotatably attached to the arm 55 at the second middle arm connection point 69 and a third bar lower end $73_L$ rotatably attached to the second rib 40 at the forward second rib connection point 49. Similarly, the fourth bar 74 has a fourth bar upper end $74_U$ rotatably attached to the arm 55 at the second aftward arm connection point 67 and a fourth bar lower end $74_L$ rotatably attached to the second rib 40 at the aftward second rib connection point 50.

FIGS. 8A-C show side views of the mechanism 100 as it moves from the retracted position RP (FIG. 8A) to a position between the retracted position and deployed positions RP, DP (FIG. 8B), and then to the deployed position (FIG. 8C). For comparison, FIGS. 9A-C show the same views as FIGS. 8A-C, respectively, but with the first rib 20 removed in order to better view the elements and connections within the mechanism 100. Additionally, FIGS. 10A-B show side views of the mechanism 100 from two opposite elevational perspectives, but with the first and second ribs 20, 40 removed, respectively.

As shown in the drawings, a first linkage connection point $J_1$ is defined by the first middle arm connection point 68 and the middle arm rotation axis $68_{ra}$, a second linkage connection point $K_1$ is defined by the first aftward arm connection point 66 and the aftward arm rotation axis $66_{ra}$, a third linkage connection point $L_1$ is defined by the aftward first rib connection point 30 and the aftward first rib rotation axis 32, and a fourth linkage connection point $M_1$ is defined by the forward first rib connection point 29 and the forward first rib rotation axis 31. A first ray I is shown extending from the fourth linkage connection point $M_1$ to the first linkage connection point $J_1$, which is also along a longitudinal centerline of the first bar 71. A second ray II is shown extending from the third linkage connection point $L_1$ to the second linkage connection point $K_1$, which is also along a longitudinal centerline of the second bar 72. And a third ray III is shown extending from the fourth linkage connection point $M_1$ to the forward arm connection point 65. These rays I, II, III are provided to show how the first and second bars 71, 72 and the arm 55 (and particularly the first bar upper end $71_U$, the second bar upper end $72_U$ and the forward arm end 56) all move in the negative pitch rotational direction NP as the mechanism 55 moves from the retracted position RP to the deployed position DP.

The first rib 20, the arm 55 and the first and second bars 71, 72 are configured so as to cooperate with each other to form a first four-bar linkage 98, which is illustrated in FIG. 10A. For example, the first four-bar linkage 98 may include a first linkage $X_1$ formed between the fourth linkage connection point $M_1$ and the first linkage connection point $J_1$ along the first bar 71, a second linkage $X_2$ formed between the first linkage connection point $J_1$ and the second linkage connection point $K_1$ along the arm 55, a third linkage $X_3$ formed between the second linkage connection point $K_1$ and the third linkage connection point $L_1$ along the second bar 72, and a fourth linkage $X_4$ formed between the third linkage connection point L and the fourth linkage connection point $M_1$ along the first rib 20. It may be noted that the first, second and third linkages $X_1$, $X_2$, $X_3$ are movable during the movement of the mechanism 100, while the fourth linkage $X_4$ remains stationary.

As shown in FIGS. 8A-C, 9A-C and 10A, the first and second bars 71, 72 are configured and connected with their respective adjoining structures so as to be rotatable about their respective forward and aftward first rib connection points 29, 30 in a negative pitch rotational direction NP until the first standoff 84 makes contact with the first extend stop 80, thereby disposing the arm 55 in the deployed position DP, and in a positive pitch rotational direction PP until the first standoff 84 is moved away from the first extend stop 80 by a first predetermined amount 77, thereby disposing the arm 55 in the retracted position RP.

Similarly, the second rib 40, the arm 55 and the third and fourth bars 73, 74 may be configured so as to cooperate with each other to form a second four-bar linkage 99, which is illustrated in FIG. 10B. Here, a fifth linkage connection point $J_2$ is defined by the second middle arm connection point 69 and the middle arm rotation axis $68_{ra}$, a sixth linkage connection point $K_2$ is defined by the second aftward arm connection point 67 and the aftward arm rotation axis $66_{ra}$, a seventh linkage connection point $L_2$ is defined by the aftward second rib connection point 50 and the aftward second rib rotation axis 52, and an eighth linkage connection point $M_2$ is defined by the forward second rib connection point 49 and the forward second rib rotation axis 51. The second four-bar linkage 99 may include a fifth linkage $X_5$ formed between the eighth linkage connection point $M_2$ and the fifth linkage connection point $J_2$ along the third bar 73, a sixth linkage $X_6$ formed between the fifth linkage connection point $J_2$ and the sixth linkage connection point $K_2$ along the arm 55, a seventh linkage $X_7$ formed between the sixth linkage connection point $K_2$ and the seventh linkage connection point $L_2$ along the fourth bar 74, and an eighth linkage $X_8$ formed between the seventh linkage connection point $L_2$ and the eighth linkage connection point $M_2$ along the second rib 40. It may be noted that the fifth, sixth and seventh linkages $X_5$, $X_6$, $X_7$ are movable during the movement of the mechanism 100, while the eighth linkage $X_8$ remains stationary.

As shown in FIG. 10B, the third and fourth bars 73, 74 are configured and connected with their respective adjoining structures so as to be rotatable about their respective forward and aftward second rib connection points 49, 50 in the negative and positive pitch rotational directions NP, PP in concert with the first four-bar linkage 98. That is, as the first, second and third linkages $X_1$, $X_2$, $X_3$ of the first four-bar linkage 98 move so as to move the mechanism 100 back and forth between the retracted and deployed positions RP, DP, the fifth, sixth and seventh linkages $X_5$, $X_6$, $X_7$ of the second four-bar linkage 99 cooperate and move in tandem with the first, second and third linkages $X_1$, $X_2$, $X_3$.

FIGS. 4-5 illustrate two different configurations of the mechanism 100, utilizing two different approaches for rendering the various connection points. More specifically, in FIG. 4, the connection points include circular through-holes through which cross-members are disposed, whereas in FIG. 5 the connection points include circular bosses. (Note that the first, second, third and fourth bars 71, 72, 73, 74 are shown in cross-section in FIGS. 4-5 without specifying whether the cross-sections are of the bar upper ends $71_U$, $72_U$, $73_U$, $74_U$ or the bar lower ends $71_L$, $72_L$, $73_L$, $74_L$. This is intentional, so as to show the alignment of each bar 71, 72, 73, 74—and more specifically, the alignment of each bar upper end $71_U$, $71_U$, $73_U$, $74_U$ or each bar lower end $71_L$, $72_L$, $73_L$, $74_L$—with the various connection points 29, 30, 49, 50, 66, 67, 68, 69.)

In FIG. 4, the first and second middle arm connection points 68, 69 may be a middle arm through-hole $68_{th}$ extending through the arm 55 between the first arm face 59 and the second arm face 61, and the first and second aftward arm connection points 66, 67 may also be an aftward arm through-hole $66_{th}$ extending through the arm 55 between the first arm face 59 and the second arm face 61. A first cross-member 36 may be disposed through the middle arm through-hole $68_{th}$ and through circular dog bone ends 76 on each of the first and third bar upper ends $71_U$, $73_U$ of the first and third bars 71, 73; likewise, a second cross-member 37 may be disposed through the aftward arm through-hole $66_{th}$ and through circular dog bone ends 76 on each of the second and fourth bar upper ends $72_U$, $74_U$ of the second and fourth bars 72, 74. Additionally, the forward first rib connection point 29 may be a forward first rib through-hole 33 extending through the first rib 20 between the first rib face 21 and the outer first rib face 23, the forward second rib connection point 49 may be a forward second rib through-hole 53 extending through the second rib 40 between the second rib face 41 and the outer second rib face 43, the aftward first rib connection point 30 may be an aftward first rib through-hole 34 extending through the first rib 20 between the first rib face 21 and the outer first rib face 23, and the aftward second rib connection point 50 may be an aftward second rib through-hole 54 extending through the second rib 40 between the second rib face 41 and the outer second rib face 43. A third cross-member 38 may be disposed through the forward first and second rib through-holes 33, 53 and through circular dog bone ends 76 on each of the first and third bar lower ends $71_L$, $73_L$ of the first and third bars 71, 73; similarly, a fourth cross-member 39 may be disposed through the aftward first and second rib through-holes 34, 54 and through circular dog bone ends 76 on each of the second and fourth bar lower ends $72_L$, $74_L$ of the second and fourth bars 72, 74.

In FIG. 5, the first and second middle arm connection points 68, 69 may each be a circular boss 35 protruding outward from the first and second arm faces 59, 61, respectively, and the first and second aftward arm connection points 66, 67 also may each be a circular boss 35 protruding outward from the first and second arm faces 59, 61, respectively. The first bar upper and lower ends $71_U$, $71_L$, the second bar upper and lower ends $72_U$, $72_L$, the third bar upper and lower ends $73_U$, $73_L$, and the fourth bar upper and lower ends $74_U$, $74_L$ may each be a circular dog bone end 76. Additionally, the forward first rib connection point 29 and the aftward first rib connection point 30 may each be a circular boss 35 protruding outward from the first rib face 21, and the forward second rib connection point 49 and the aftward second rib connection point 50 may each be a circular boss 35 protruding outward from the second rib face 41. In this arrangement, the first bar upper end $71_U$ rotatably connects with the circular boss 35 at the first middle arm connection point 68, the first bar lower end $71_L$ rotatably connects with the circular boss 35 at the forward first rib connection point 29, the second bar upper end $72_U$ rotatably connects with the circular boss 35 at the first aftward arm connection point 66, the second bar lower end $72_L$ rotatably connects with the circular boss 35 at the aftward first rib connection point 30, the third bar upper end $73_U$ rotatably connects with the circular boss 35 at the second middle arm connection point 69, the third bar lower end $73_L$ rotatably connects with the circular boss 35 at the forward second rib connection point 49, the fourth bar upper end $74_U$ rotatably connects with the circular boss 35 at the second aftward arm connection point 67, and the fourth bar lower end $74_L$ rotatably connects with the circular boss 35 at the aftward second rib connection point 50. Since the first and second four-bar linkages 98, 99 may move together and in tandem with each other, the first and third bars 71, 73 may be connected or ganged together with each other, and the second and fourth bars 72, 74 may be connected or ganged together with each other.

These connections among the first through fourth bars 71, 72, 73, 74 and their corresponding arm connection points 66, 67, 68, 69 and rib connection points 29, 30, 49, 50 is described in further detail below, with reference to TABLE 1 and FIGS. 4-5 and 26-29.

In several of the drawings (e.g., FIGS. 2B, 4-6, 9A-C and 10A), the first extend stop 80 and the first standoff 84 are shown, with some drawings (e.g., FIGS. 4 and 7) additionally or alternatively showing a second extend stop 90 and a second standoff 94. Thus, the mechanism 100 of the first embodiment may include (i) a first extend stop 80 and a first standoff 84, or (ii) a second extend stop 90 and a second standoff 94, or (iii) a first extend stop 80, a first standoff 84, a second extend stop 90 and a second standoff 94.

The first extend stop 80 is disposed on the first rib face 21, and the first standoff 84 is disposed on the first arm face 59. In similar fashion, the second extend stop 90 is disposed on the second rib face 41, and the second standoff 94 is disposed on the second arm face 61. One of the first extend stop 80 and the first standoff 84 may be magnetic M, and the other of the first extend stop 80 and the first standoff 84 may be magnetic M or ferromagnetic FM. Similarly, one of the second extend stop 90 and the second standoff 94 may be magnetic M, and the other of the second extend stop 90 and the second standoff 94 may be magnetic M or ferromagnetic FM.

As used herein, an element being "magnetic" means that the element is magnetized and has a given "polarity", which refers to the spatial orientation of the magnetized element's North and South magnetic poles. For example, an element may have a first polarity $P_1$, meaning that the element's North and South magnetic poles are spatially oriented along an axis, with the North pole pointing in one direction along the axis and the South pole pointing in the opposite direction along the axis. In contrast, a second polarity $P_2$ may be defined as a magnetic polarity (i.e., a spatial arrangement of the North and South poles) that is opposite that of the first polarity $P_1$. A magnetized or magnetic first element having a first polarity $P_1$ may be attracted toward or repelled by a second magnetized or magnetic element, depending on the magnetic polarity of the second element, and according to the maxim that "opposite poles are attracted to each other, and like poles are repelled by each other". For instance, if the first and second magnetized/magnetic elements are disposed relatively close to each other with their magnetic axes being generally colinear with each other, the two elements will be magnetically attracted to each other if they have opposite polarities—i.e., the North pole of one element is pointing toward the South pole of the other element—and the two elements will be magnetically repelled by each other if they have the same polarity—i.e., the North pole of one element is pointing toward the North pole of the other element, or the South pole of one element is pointing toward the South pole of the other element. Thus, it may be said that two magnetized or magnetic elements may be attracted to each other if they have substantially opposite polarities from each other, and repelled by each other if they have substantially the same polarities as each other.

Additionally, a magnetized or magnetic element may also be attracted to another element if the other element is not magnetic M but is ferromagnetic FM. As used herein, an element being "ferromagnetic" means that the element is not magnetized or magnetic, but is made of a material to which a magnetized/magnetic element is attracted, but not repelled. Examples of materials which a ferromagnetic element may be made of include iron, cobalt, nickel, neodymium, gadolinium, terbium and dysprosium, as well as steel which contains iron. It may be noted that an element that is magnetic M may be made of one or more of the foregoing materials, but the distinction between an element being magnetic M versus ferromagnetic FM is that a magnetic element exerts a substantial magnetic field, while a ferromagnetic element exerts little or no magnetic field. In some configurations, an element may be considered as being magnetic M if it is "electromagnetic"—that is, if the element is normally a ferromagnetic FM element with little or none of its own intrinsic magnetism, but which may be made temporarily magnetic M by passing a current through, around or nearby to the element, such as through a coil. If such an approach is used in a configuration like that shown in FIG. 11A, where one or both of the first extend stop 80 and the first standoff 84 is an electromagnet, then care should be taken with the direction(s) of flow of current through the element(s), so that the first extend stop 80 and the first standoff 84 have opposite polarities so that they will magnetically attract each other.

For example, FIG. 11A shows the first extend stop 80 being magnetic M and having a first polarity $P_1$, with the first standoff 84 also being magnetic M but having a second polarity $P_2$ that is opposite the first polarity $P_1$, thus causing a magnetic attraction MA between the first extend stop 80 and the first standoff 84. Note that if both of these elements had the same polarity as each other—i.e., both had the same first polarity $P_1$, or both had the same second polarity $P_2$—there would be no magnetic attraction MA between them, but rather a magnetic repulsion would exist between them. Alternatively, as shown in FIGS. 11B-C, one of the first extend stop 80 and the first standoff 84 may be magnetic M, and the other of the first extend stop 80 and the first standoff 84 may be ferromagnetic FM; in such cases, a magnetic attraction MA would be generated between the first extend stop 80 and the first standoff 84, but no magnetic repulsion would be generated. When the mechanism 100 and arm 55 are disposed in the deployed position DP, wherein the first extend stop 80 and the first standoff 84 are disposed in contact with each other, magnetic attraction MA between the first extend stop 80 and the first standoff 84 may urge the first extend stop 80 and the first standoff 84 to remain in contact with each other, thus also urging the arm 55 to remain in the deployed position DP.

Returning now to the extend stop/standoff structures, the first extend stop 80 may extend outward from the first rib face 21, and may include a first aftward magnetic/ferromagnetic member 88 having a first aftward face 82. The first standoff 84 may extend outward from first arm face 59, and may include a first forward magnetic/ferro-magnetic member 87 having a first forward face 86. Since the first standoff 84 is attached to or is made integral with the arm 55, and the first extend stop 80 is attached to or is made integral with the first rib 20, the first standoff 84 is moved through space as the arm 55 is moved, while the first extend stop 80 remains stationary along with the first rib 20. The first extend stop 80 and the first standoff 84 may extend out from their respective faces and toward each other, such that when the mechanism 100 is moved from the retracted position RP to the deployed position DP, the first forward face 86 of the moving first standoff 84 is brought into mechanical contact with the first aftward face 82 of the stationary first extend stop 80. With each of the first extend stop 80 and the first standoff 84 being magnetic M and/or ferromagnetic FM as described above, the abovementioned mechanical contact between the first extend stop 80 and the first standoff 84 provides very strong magnetic attraction MA therebetween.

The second extend stop 90 may extend outward from the second rib face 41, and may include a second aftward magnetic/ferro-magnetic member 97 having a second aftward face 92. The second standoff 94 may extend outward from second arm face 61, and may include a second forward magnetic/ferro-magnetic member 96 having a second forward face 95. Since the second standoff 94 is attached to or is made integral with the arm 55, and the second extend stop 90 is attached to or is made integral with the second rib 40, the second standoff 94 is moved through space as the arm 55 is moved, while the second extend stop 90 remains stationary along with the second rib 40. The second extend stop 90 and the second standoff 94 may extend out from their respective faces and toward each other, such that when the mechanism 100 is moved from the retracted position RP to the deployed position DP, the second forward face 95 of the moving second standoff 94 is brought into mechanical contact with the second aftward face 92 of the stationary second extend stop 90. With each of the second extend stop 90 and the second standoff 94 being magnetic M and/or ferromagnetic FM as described above, the abovementioned mechanical contact between the second extend stop 90 and the second standoff 94 provides very strong magnetic attraction MA therebetween.

Optionally, as shown in FIGS. 2A, 3A-B, 8A-C and 10B, an extend stop fitting 79 may be attached to the first front face 25 of the first rib 20, and/or to the second front face 45 of the second rib 40. The extend stop fitting(s) 79 may be included in order to attach the first and/or second extend stops 80, 90 thereto. When an extend stop fitting 79 is attached to the first front face 25 of the first rib 20, it may be considered as being integral or continuous with the first rib 20, such that the first rib face 21 extends to the adjacent face of the first stop fitting 79 as well. Similarly, when an extend stop fitting 79 is attached to the second front face 45 of the second rib 40, it may be considered as being integral or continuous with the second rib 40, such that the second rib face 41 extends to the adjacent face of the first stop fitting 79 as well.

A purpose and advantage of providing the stationary first extend stop 80 and the movable first standoff 84 (and/or of providing the stationary second extend stop 90 and the movable second standoff 94) is to provide a mechanical stop when the first forward face 86 of the moving first standoff 84 is brought into contact with the first aftward face 82 of the stationary first extend stop 80, in order to prevent the arm 55 from moving any further forward beyond the deployed position DP.

A purpose and advantage of the first extend stop 80 and the first standoff 84 (and/or the second extend stop 90 and the second standoff 94) being magnetic M and/or ferromagnetic FM is to utilize magnetic attraction MA between the first extend stop 80 and the first standoff 84 (and/or between the second extend stop 90 and the second standoff 94) in order to maintain the arm 55 (and any aircraft wing slat 19 that is attached thereto) in the deployed position DP during flight, and to prevent the arm 55 (and any aircraft wing slat 19 that is attached thereto) from being pushed out of the deployed position DP during flight due to air resistance that may be acting upon the aircraft wing slat 19.

It may be noted that much of the structure and connections of the mechanism 100 of the first embodiment as shown in FIGS. 2A-11C may also apply to the mechanisms 200, 300 of the second and third embodiments as well, except where the abovementioned "additional structures for maintaining the arm 55 in the deployed position DP" of the first embodiment—namely, the first extend stop 80 and the first standoff 84, where one or both of these are magnetic M—are replaced with the arm lobe 110 and cross-bolt 120 of the second embodiment, or the bar lobe 210 and linear member 220 of the third embodiment.

Figure 12A:
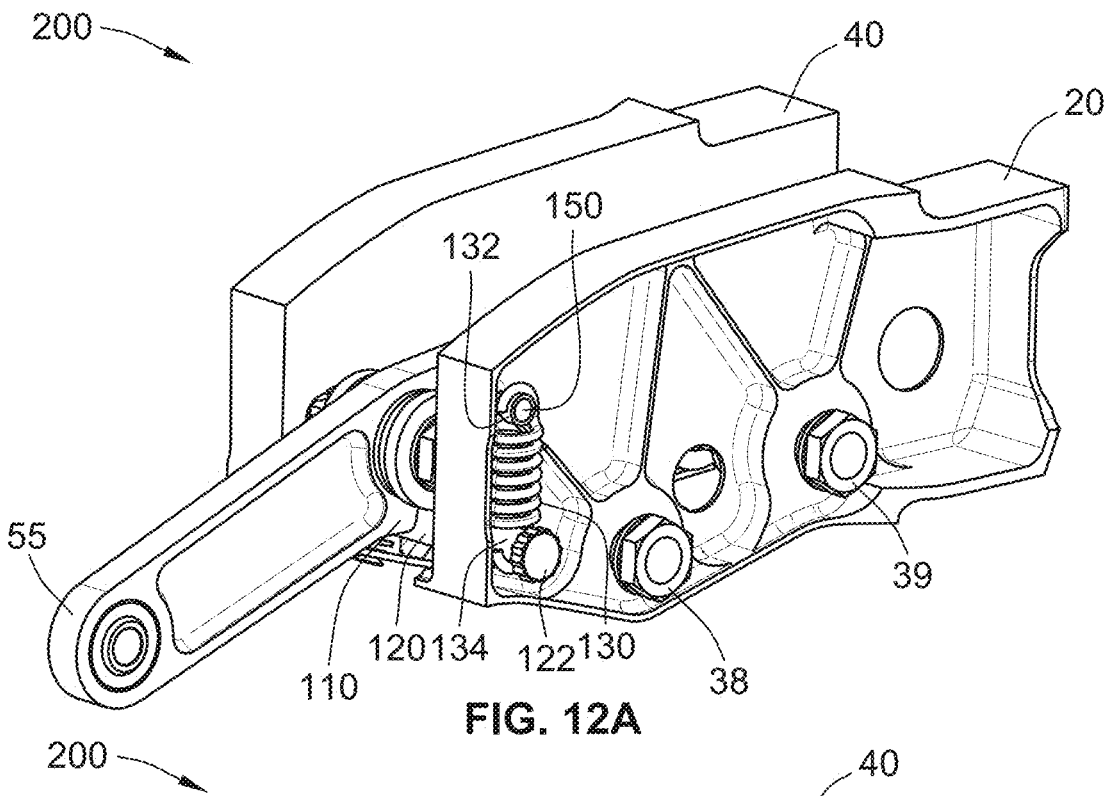
FIG. 12A is a perspective view of a mechanism according to a second embodiment.
Figure 12B:
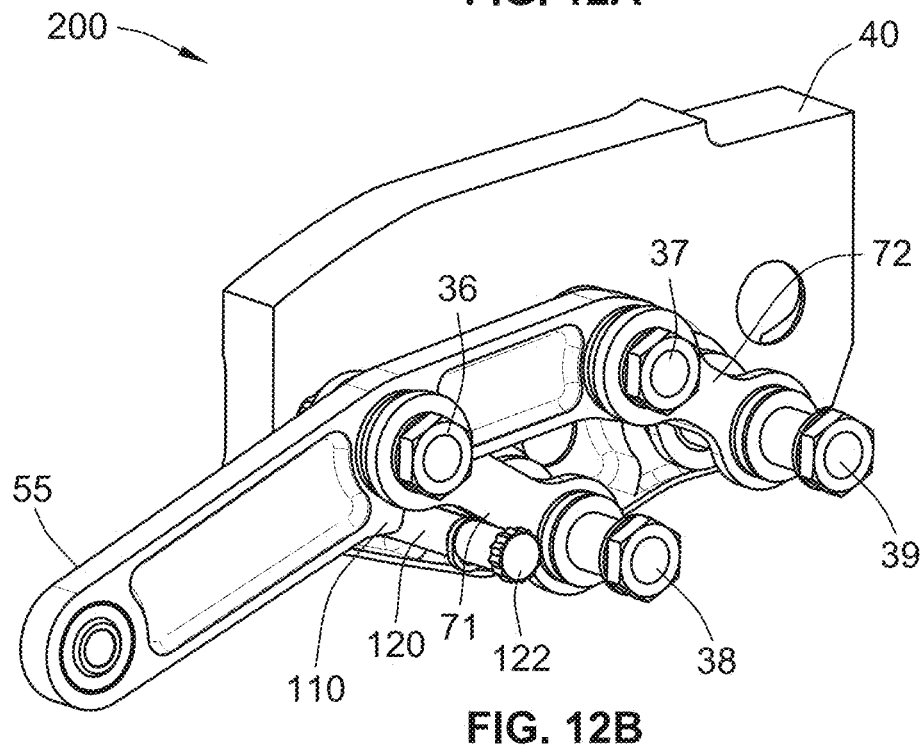
FIG. 12B is the same view as FIG. 12A but with the first rib and first biasing member removed.
Figure 13:
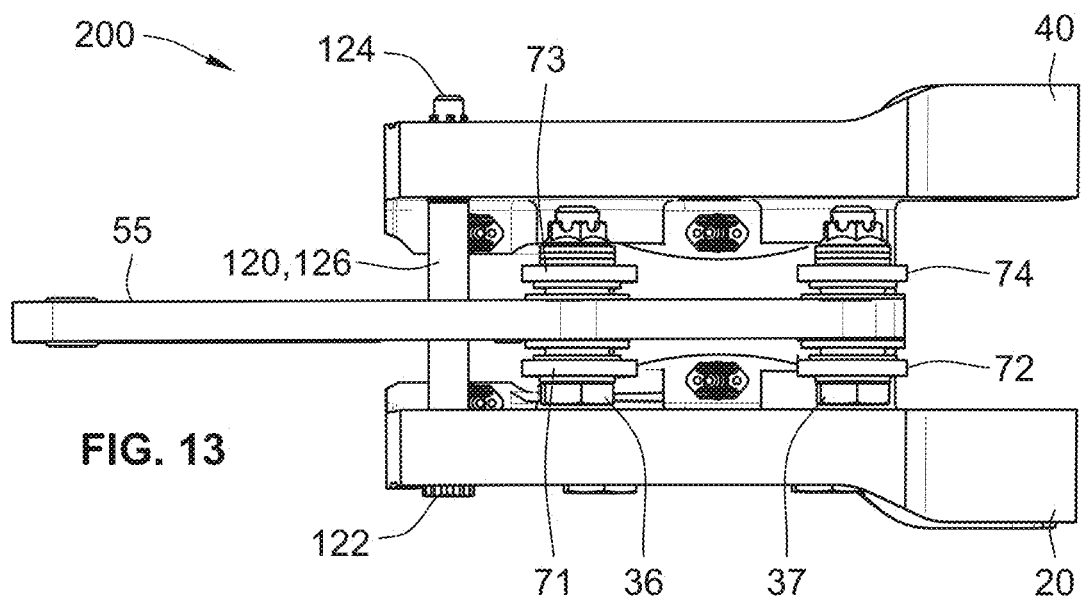
FIG. 13 is a top view of the mechanism according to the second embodiment.
Figure 14:
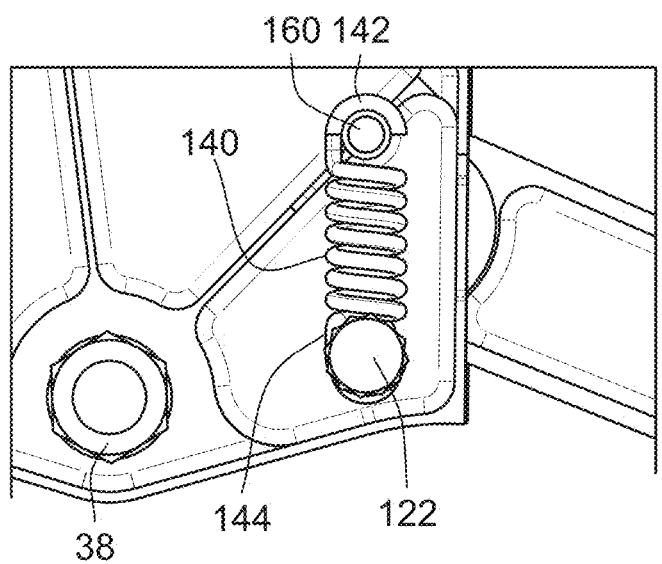
FIG. 14 is a close-up side view of a second biasing member according to the second embodiment.
Figure 15:
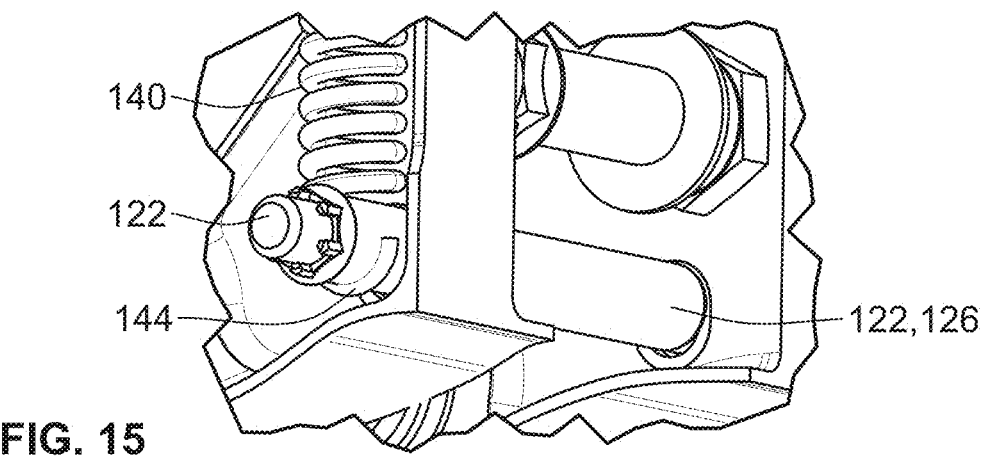
FIG. 15 is a close-up perspective view of a first biasing member and a cross-bolt according to the second embodiment.
Figure 17A:
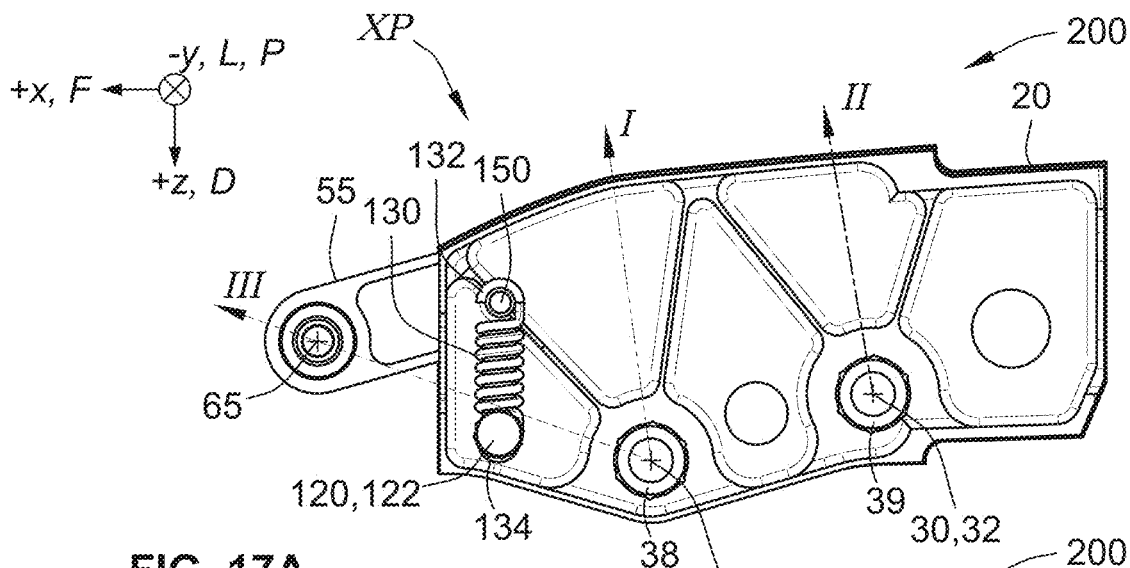
FIG. 17A-C are side views of the mechanism according to the second embodiment, showing a default position, a position between the default position and an extended position, and the extended position, respectively.
Figure 17B:
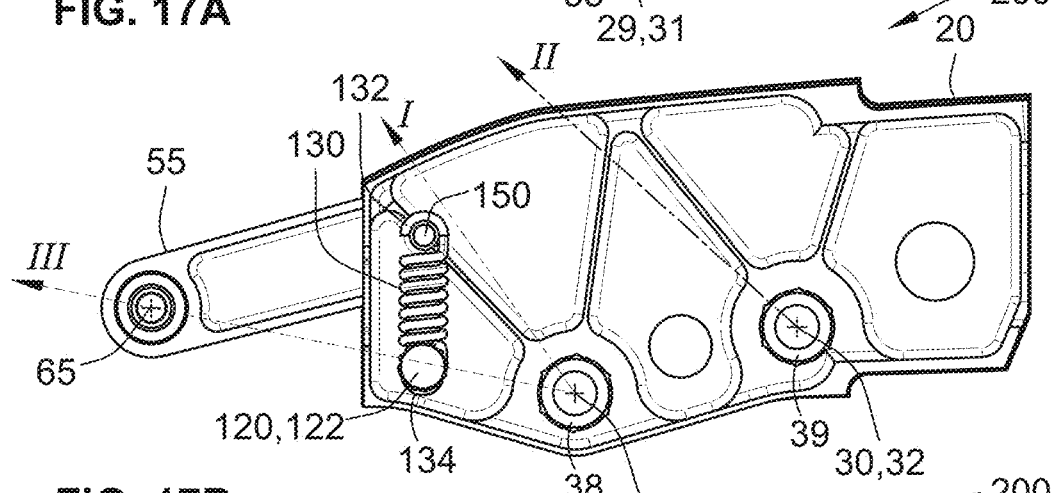
Figure 17C:
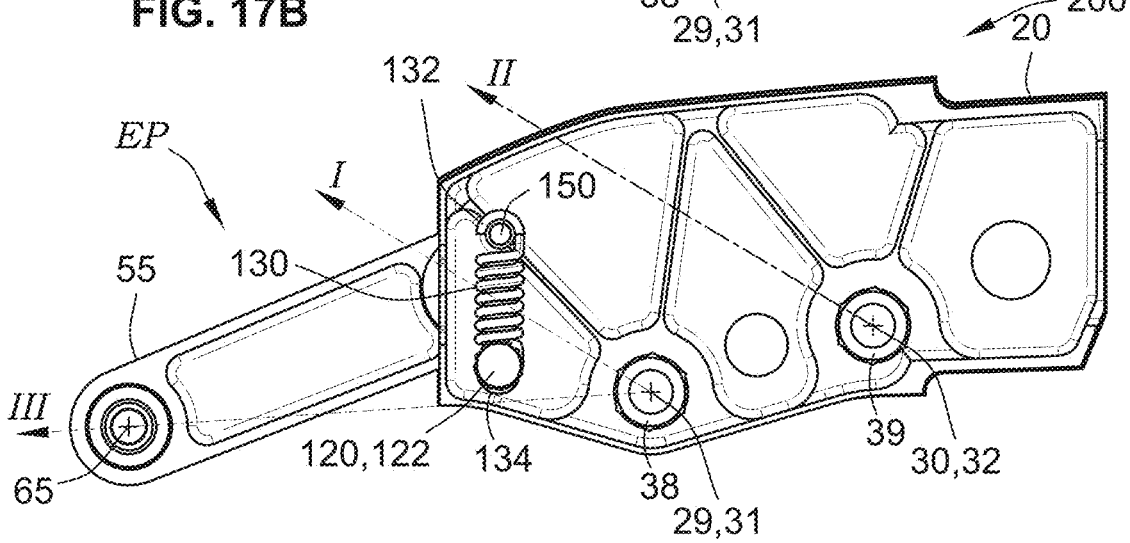
Figure 18A:
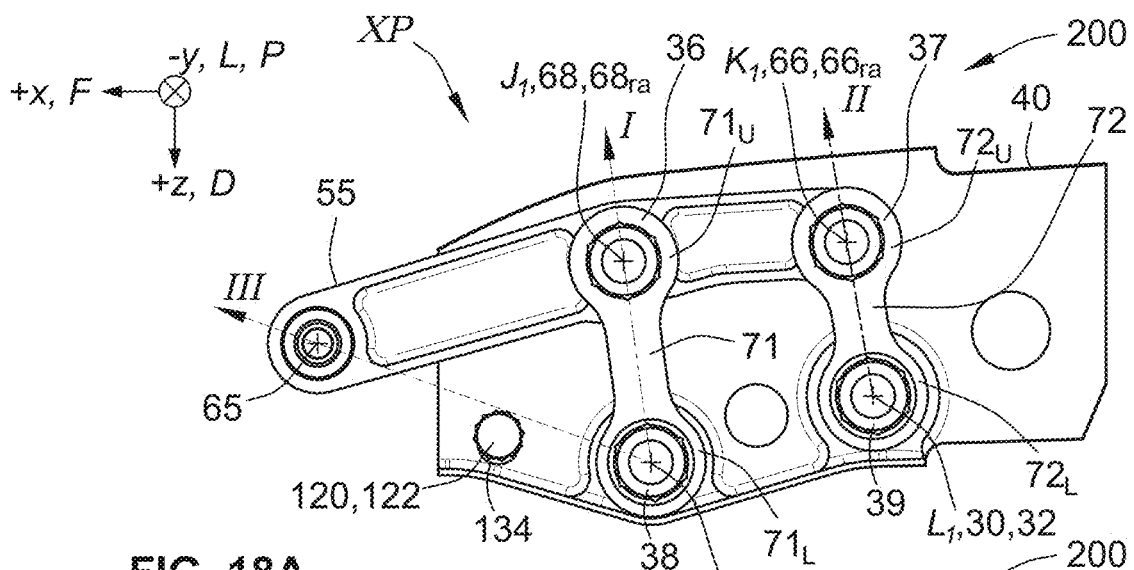
FIGS. 18A-C are the same views as FIGS. 17A-C, respectively, but with the first rib removed.
Figure 18B:
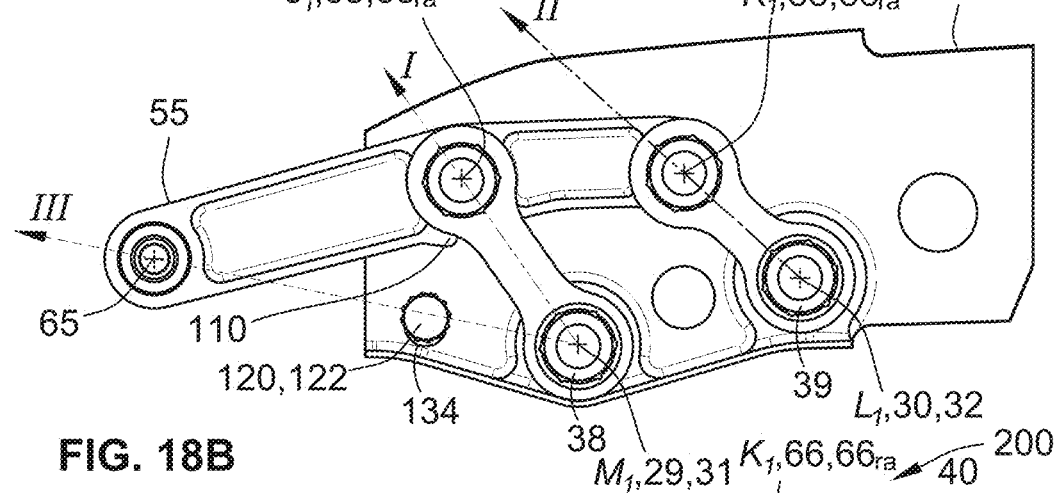
Figure 18C:
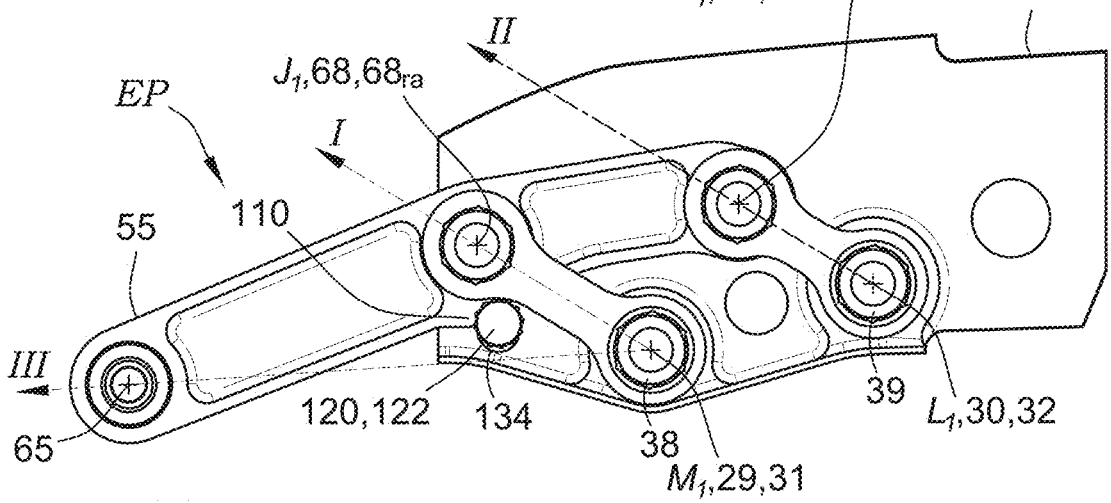

Turning now to the second embodiment, FIG. 12A shows a perspective view of the mechanism 200, including a first biasing member 130 and a cross-bolt 120, and FIG. 12B shows the same view as FIG. 12A but with the first rib 20 and first biasing member 130 removed. FIG. 13 shows a top view of the mechanism 200, FIG. 14 shows a close-up side view of a second biasing member 140, and FIG. 15 shows a close-up perspective view of the first biasing member 130 and cross-bolt 120. FIG. 16 shows a side view of the arm 55, including an arm lobe 110. FIG. 17A-C provide side views of the mechanism 200, showing a default position XP, a position between the default position XP and an extended position EP, and the extended position EP, respectively; FIGS. 18A-C show the same views as FIGS. 17A-C, respectively, but with the first rib 20 removed. And FIGS. 19A-E show a sequence of schematic cross-sectional side views of the arm 55 and arm lobe 110 making contact with an outer cross-bolt surface 126 of the cross-bolt 120.

As noted above, much of the structure and connections of the mechanism 100 of the first embodiment may also apply to the mechanism 200 of the second embodiment. However, the mechanism 200 of the second embodiment also includes a first rib opening 118 extending through the first rib 20 between the first rib face 21 and the outer first rib face 23, a second rib opening 119 in the second rib 40 between the second rib face 41 and the outer second rib face 43, an outer first rib connection point 150 on the outer first rib side 24 (e.g., on the outer first rib face 23), an outer second rib connection point 160 on the outer second rib side 44 (e.g., on the outer second rib face 43), and a cross-bolt 120 having a first cross-bolt end 122 extending through the first rib opening 118, a second cross-bolt end 124 extending through the second rib opening 119, and an outer cross-bolt surface 126 between the first and second cross-bolt ends 122, 124. The mechanism 200 also includes a first biasing member 130 (e.g., a helical tension spring) having a first biasing member upper end 132 attached to the outer first rib connection point 150 and a first biasing member lower end 134 attached to the first cross-bolt end 122, and a second biasing member 140 having a second biasing member upper end 142 attached to the outer second rib connection point 160 and a second biasing member lower end 144 attached to the second cross-bolt end 124. The mechanism 200 further includes the abovementioned arm lobe 110 extending downward from the bottom arm face 64 of the arm 55.

As shown in FIG. 16, the bottom arm face 64 includes a generally straight or curved linear region or profile forward of the arm lobe 110, and a generally straight or curved linear region or profile aftward of the arm lobe 110, with the arm lobe 110 representing an outwardly or downwardly extending discontinuity from these straight or curved linear regions. If the arm lobe 110 were not included on the bottom arm face 64, then one can imagine that the bottom arm face 64 would continue along the dashed lines shown, which represent a bottom arm face lobe-free profile 70. That is, if the arm lobe 110 were not included, then an entirety of the bottom arm face 64 would be a continuous bottom arm face lobe-free profile 70.

The arm lobe 110 includes an arm lobe peak 112, a forward ramp surface 114 forward of the arm lobe peak 112, and an aftward ramp surface 116 aftward of arm lobe peak 112. Immediately adjacent and aftward of the aftward ramp surface 116, the bottom arm face 64 includes a landing portion 64L.

Figure 19A:
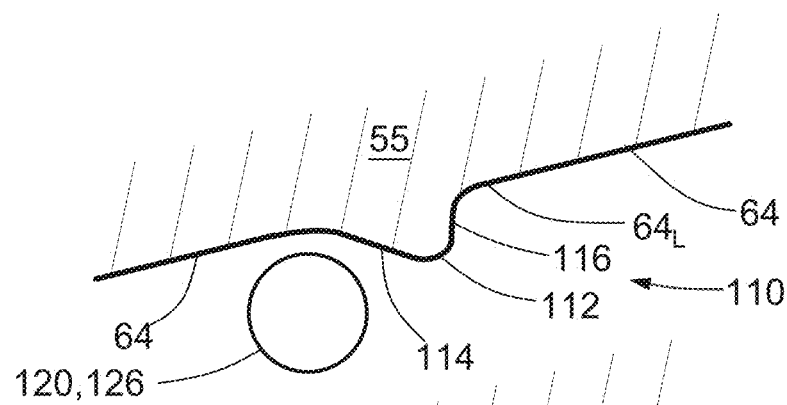
FIGS. 19A-E are a sequence of schematic cross-sectional side views of the arm and arm lobe making contact with the cross-bolt.
Figure 19B:
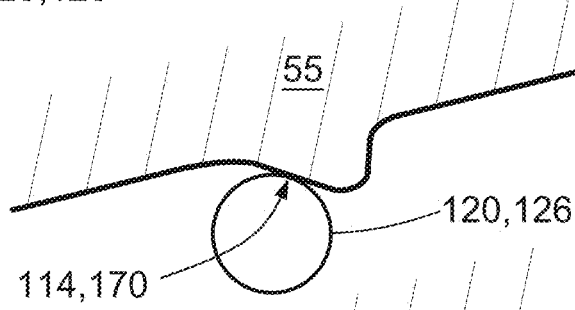
Figure 19C:
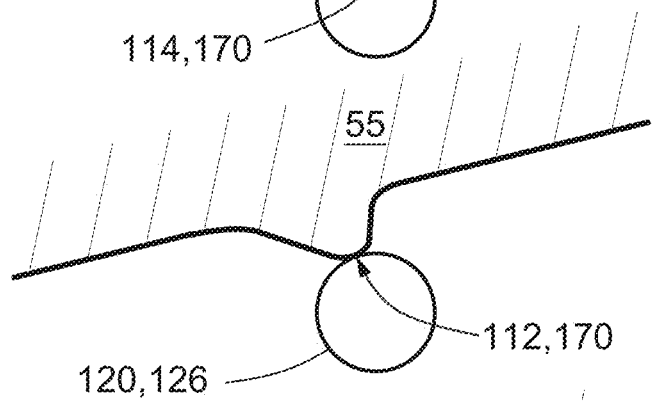
Figure 19D:
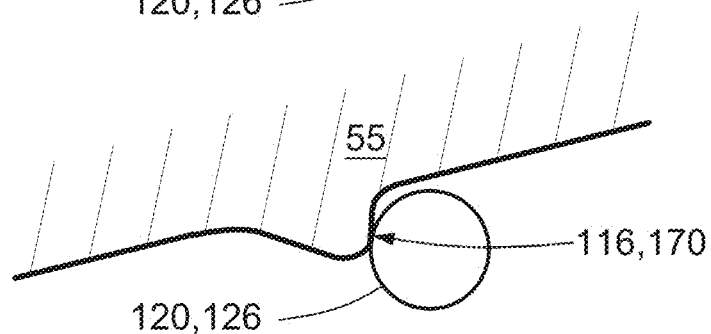
Figure 19E:
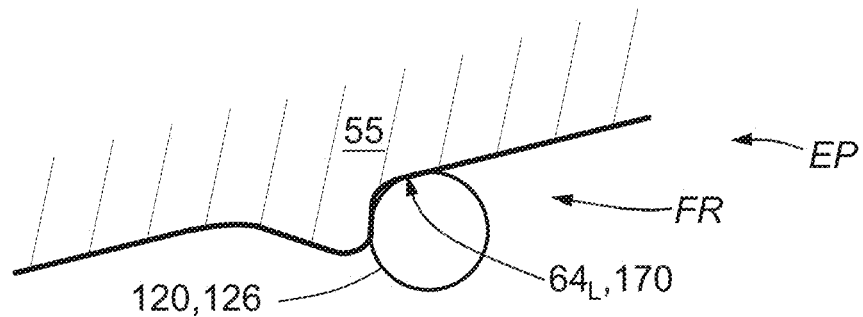

FIGS. 19A-E illustrate a sequence of schematic cross-sectional side views of the arm 55 and arm lobe 110 making contact with the outer cross-bolt surface 126 of the cross-bolt 120. In FIG. 19A, the arm 55 has been moved forward in the negative pitch rotational direction NP, but no contact has been made between the outer cross-bolt surface 126 and the arm lobe 110. In this position, the cross-bolt 120 is held against the upper rim of the first and second rib openings 118, 119 by the upward pull of the first and second biasing members 130, 140, which are in slight tension. Then the arm 55 continues to move forward until the outer cross-bolt surface 126 successively makes contact with the forward ramp surface 114 (FIG. 19B), the first arm lobe peak 112 (FIG. 19C), the aftward ramp surface 116 (FIG. 19D) and then the landing portion 64L of the arm bottom surface 64 (FIG. 19E).

When the cross-bolt 120 and arm lobe 110 are positioned as shown in FIG. 19B, the outer cross-bolt surface 126 initiates contact with the arm lobe 110 at the forward ramp surface 114, and more specifically at a first contact point 170 between the outer cross-bolt surface 126 and the forward ramp surface 114. Then, in FIG. 19C, the arm lobe 110 pushes downward on the cross-bolt 120 as the arm 55 continues to move forward. This downward push upon the cross-bolt 120 causes the first and second biasing members 130, 140 to stretch and elongate, since the first and second biasing member lower ends 134, 144 are attached to the first and second cross-bolt ends 122, 124, respectively. Note that the first and second rib openings 118, 119 may be elongated vertical holes or slots, rather than circular holes, thus allowing the first and second cross-bolt ends 122, 124 to move upward and downward within the elongated holes or slots. At the position shown in FIG. 19C where the outer cross-bolt surface 126 makes contact with the arm lobe 110 at the arm lobe peak 114, the first and second biasing members 130, 140 are stretched to their maximum extension. Then as the outer cross-bolt surface 126 continues its contact with the arm lobe 110 along the aftward ramp surface 116 as shown in FIG. 19D, the arm lobe 110 decreases its downward push against the cross-bolt 120 and the first and second biasing members 130, 140 are stretched less.

Finally, as the arm 55 reaches the extended position EP shown in FIG. 19E, the outer cross-bolt surface 126 comes to rest against the landing portion 64L on the bottom arm face 64 (and optionally also against the aftward ramp surface 116). In this position, the first and second biasing members 130, 140 are in greater tension than the position shown in FIG. 19A, but they are in less tension than the position shown in FIG. 19C. This tension provided by the arrangement shown in FIG. 19E helps keep the arm 55 in the extended position EP during flight despite air resistance pushing aftward against the aircraft wing slat 19 and thus also aftward against the arm 55. Additionally, frictional resistance FR between the outer cross-bolt surface 126 and the aftward ramp surface 116 in the extended position EP also urges the arm 55 to remain in the extended position EP.

Figure 20A:
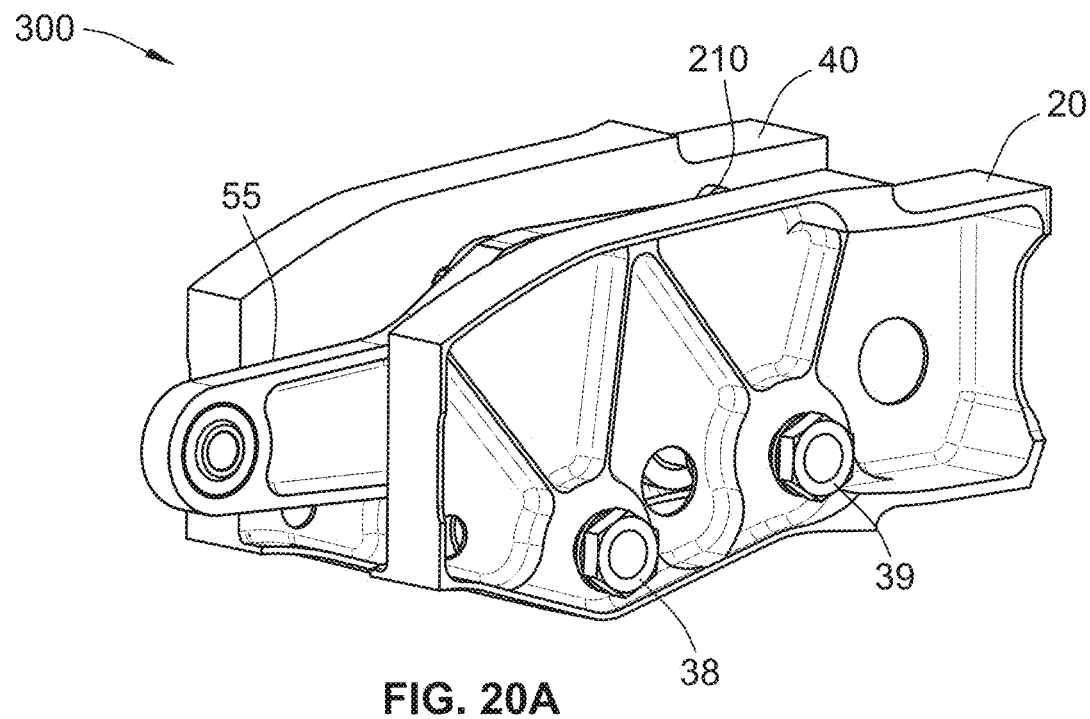
FIG. 20A is a perspective view of a mechanism according to a third embodiment.
Figure 20B:
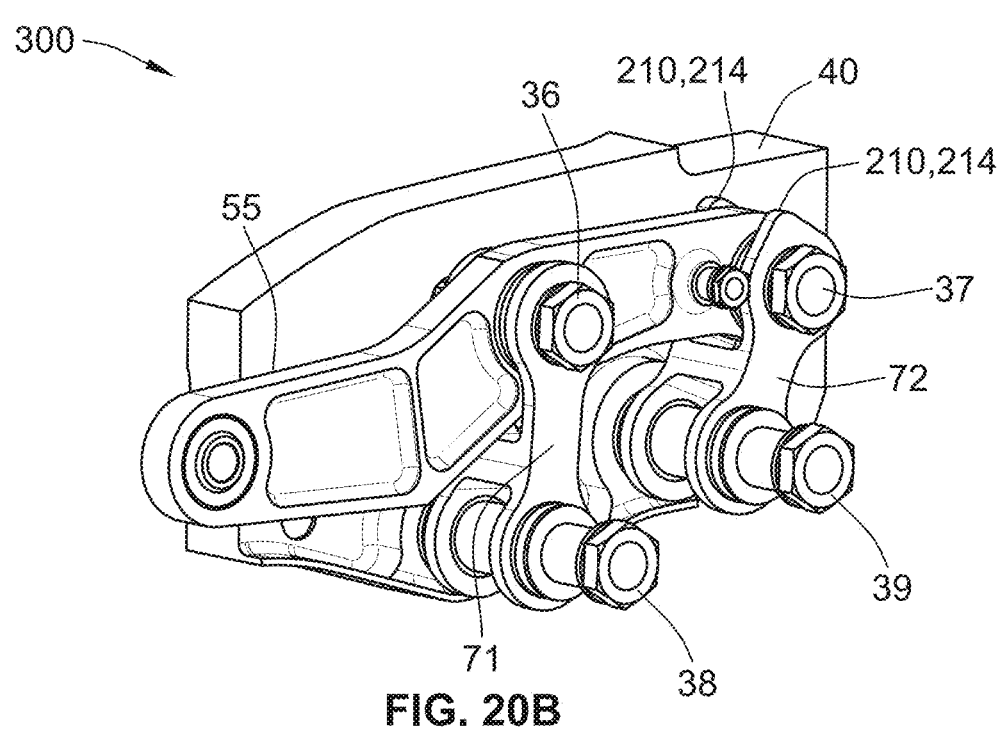
FIG. 20B is the same view as FIG. 20A but with the first rib removed.
Figure 21:
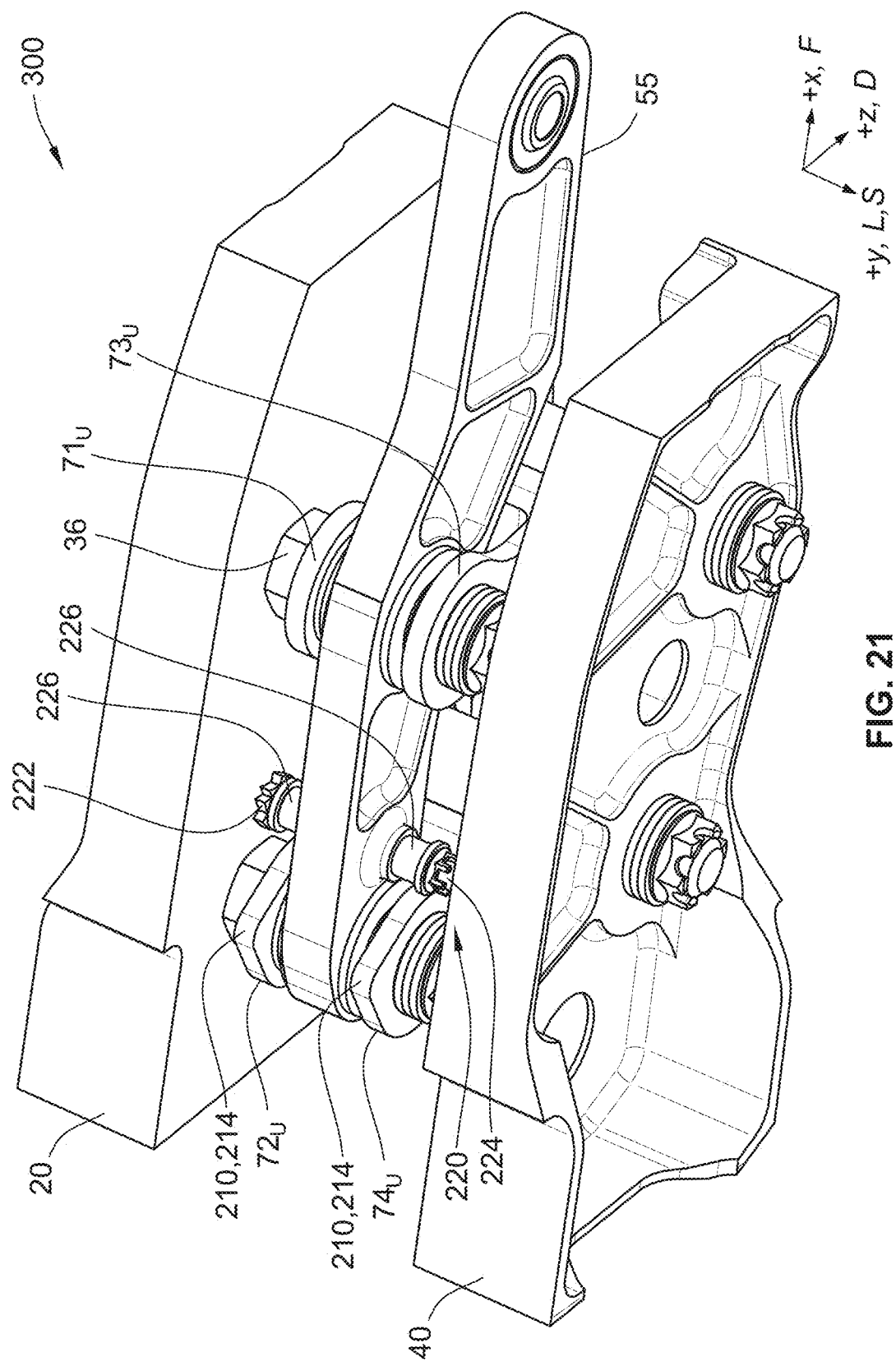
FIG. 21 is another perspective view of the mechanism according to the third embodiment.
Figure 22:
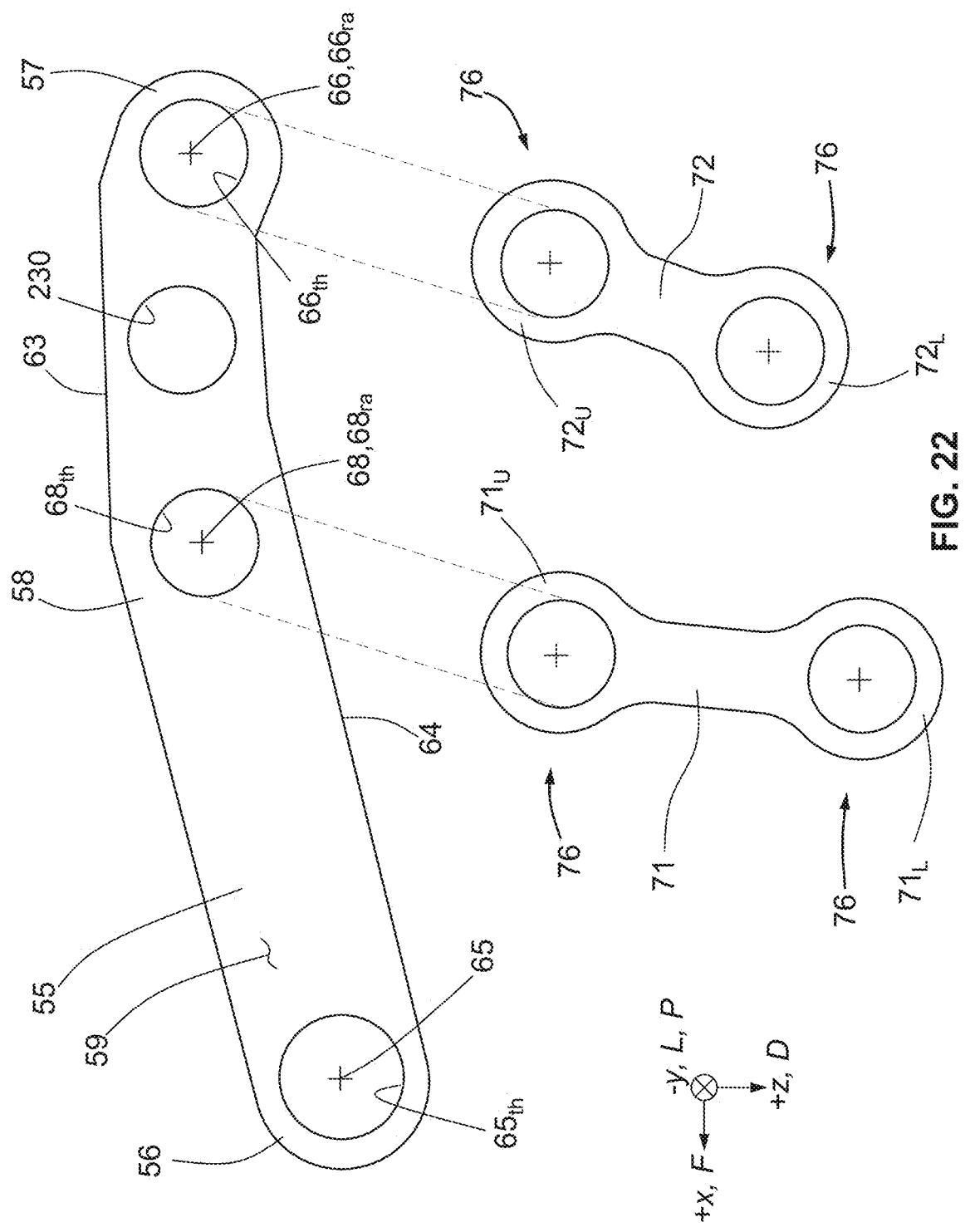
FIG. 22 is a side view of the arm according to the third embodiment.
Figure 23A:
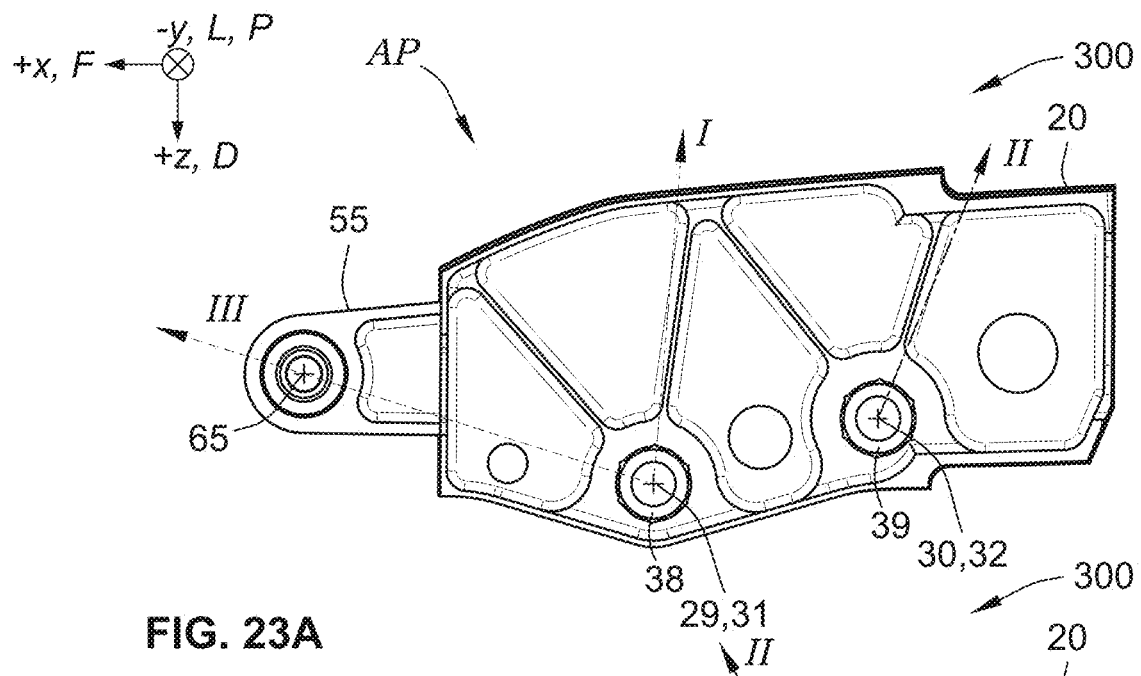
FIGS. 23A-C are side views of the mechanism according to the third embodiment, showing an aftward position, a position between the aftward position and a forward position, and the forward position, respectively.
Figure 23B:
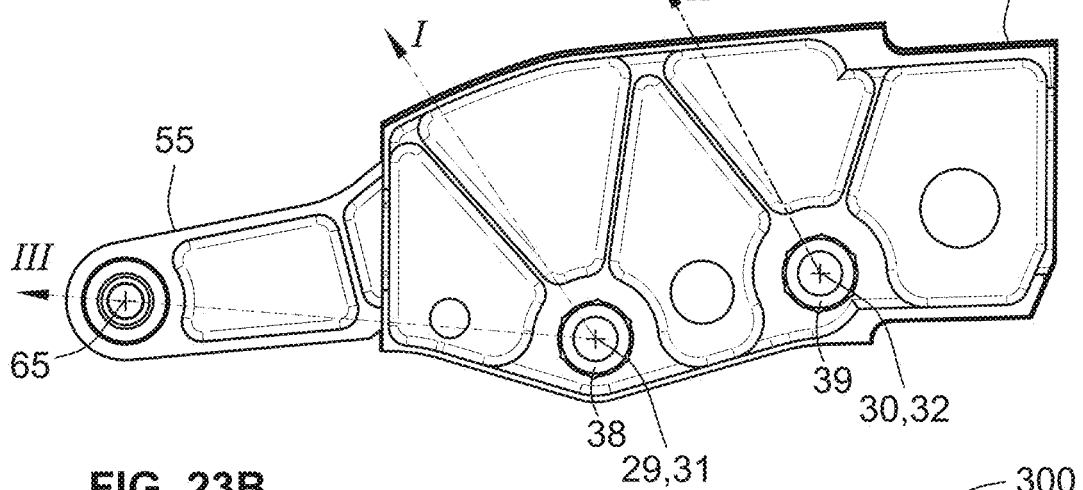
Figure 23C:
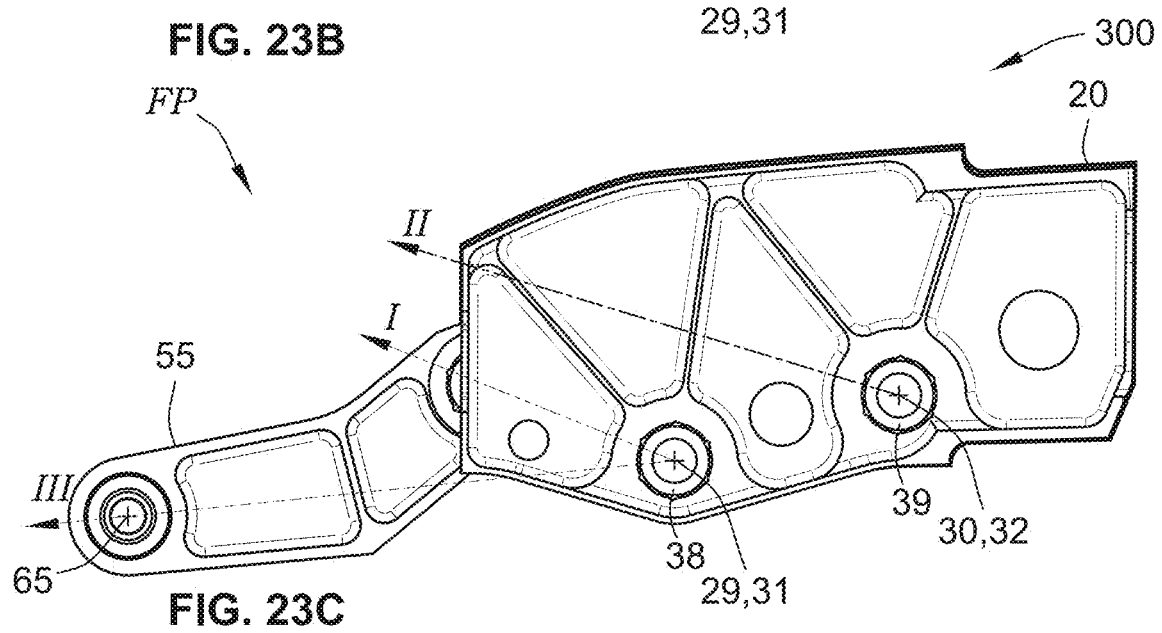
Figure 24A:
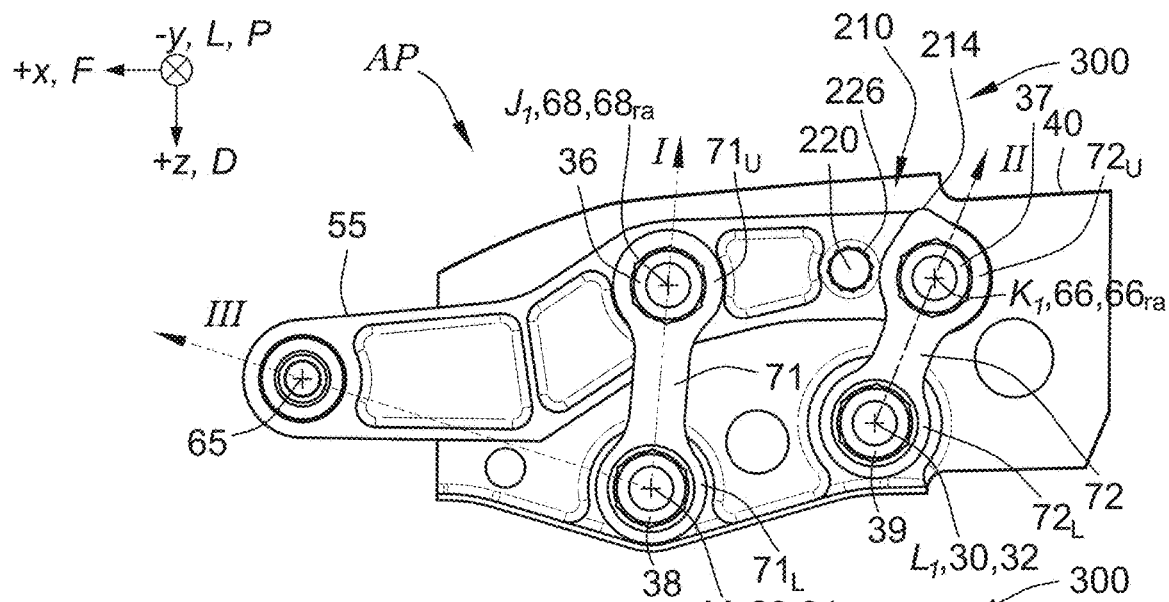
FIGS. 24A-C are the same views as FIGS. 23A-C, respectively, but with the first rib removed.
Figure 24B:
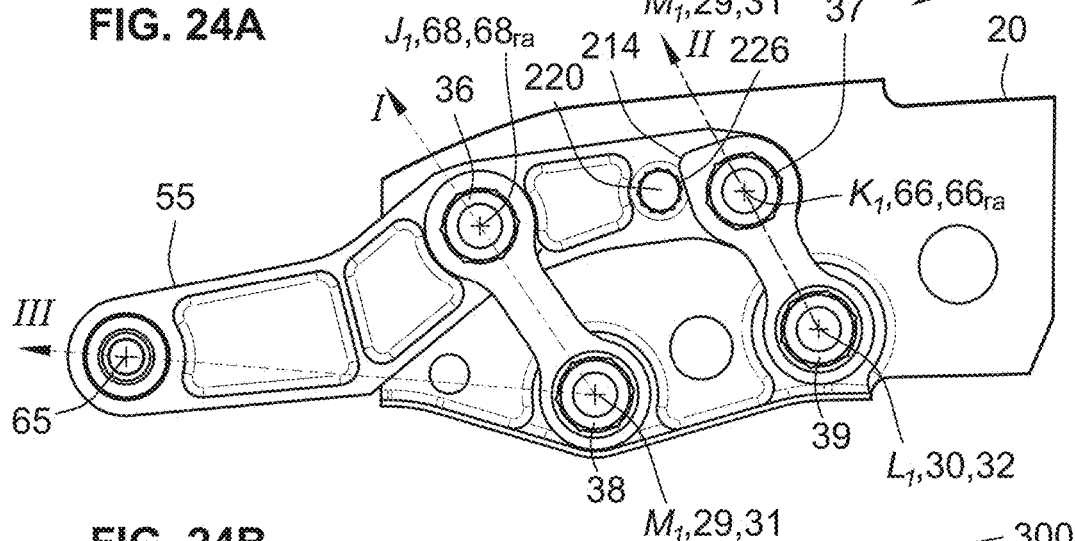
Figure 24C:
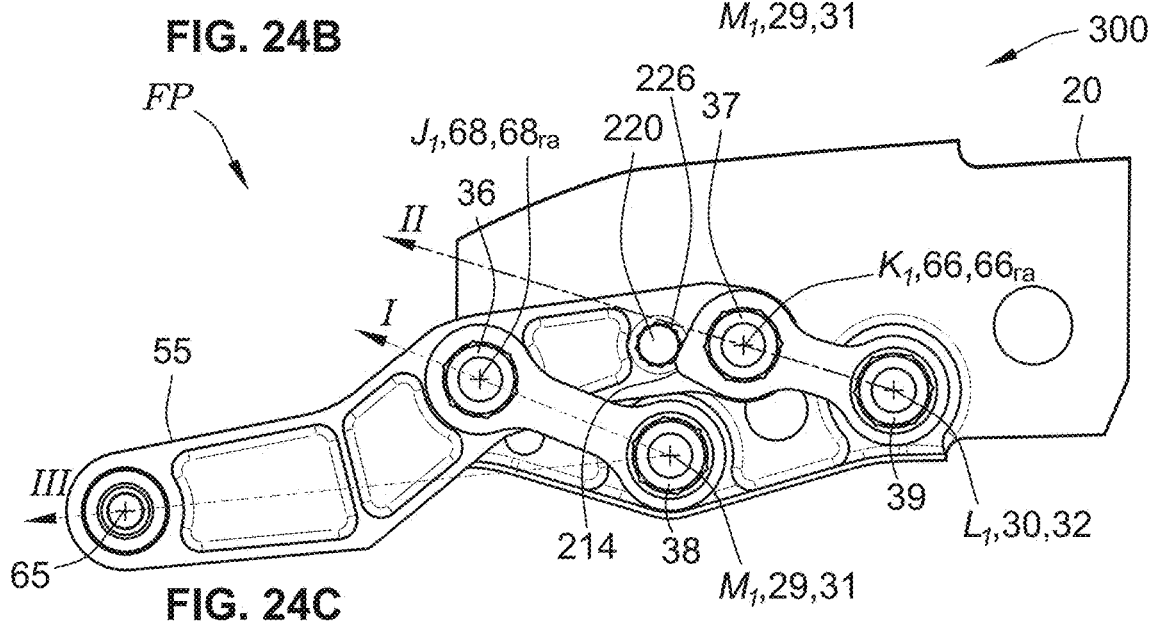

Turning now to the third embodiment, FIG. 20A shows a perspective view of the mechanism 300, and FIG. 20B shows the same view as FIG. 20A but with the first rib 20 removed. FIG. 21 shows another perspective view of the mechanism 300, and FIG. 22 shows a side view of the arm 55 and the first and second bars 71, 72. FIGS. 23A-C provide side views of the mechanism 300, showing an aftward position AP, a position between the aftward position AP and a forward position FP, and the forward position FP, respectively; FIGS. 24A-C show the same views as FIGS. 23A-C, respectively, but with the first rib 20 removed. And FIGS. 25A-D show a sequence of schematic cross-sectional side views of a bar lobe 210 on a bar (e.g., on the second bar 72) making contact with a linear member 220.

As noted above, much of the structure and connections of the mechanism 100 of the first embodiment may also apply to the mechanism 300 of the third embodiment. However, the mechanism 300 of the second embodiment also includes a bar lobe 210 extending radially outward from the first or second bar upper end $71_U$, $72_U$ of the respective first or second bar 71, 72, and a linear member 220 disposed at least partially on the first arm side 60.

As illustrated in FIGS. 25A-D, a bar lobe 210 is shown extending radially outward from the second bar upper end $72_U$ of a second bar 72. The second bar upper end $72_U$ has a generally circular profile with a generally circular circumferential cam surface 212 which defines a rotationally forward negative pitch rotational direction NP and a rotationally aftward positive pitch rotational direction PP. The circumferential cam surface 212 is mostly circular in profile, except for the bar lobe 210 which extends radially outward from the circular profile. If the bar lobe 210 were not included on the circumferential cam surface 212, then one can imagine that the circumferential cam surface 212 would continue along the dashed lines shown, which represent a circumferential lobe-free profile 215. That is, if the bar lobe 210 were not included, then an entirety of the circumferential cam surface 212 would be a circumferential lobe-free profile 215 that is completely circular.

The bar lobe 210 has a bar lobe peak 214, a first ramp surface 216 on a rotationally forward side 217 of the bar lobe peak 214, and a second ramp surface 218 on a rotationally aftward side 219 of the bar lobe peak 214.

The linear member 220 is disposed at least partially on the first arm side 60 and has a first linear member end 222 extending outward from the first arm face 59. The linear member 220 may also be disposed at least partially on the second arm side 62, with a second linear member end 224 extending outward from the second arm face 61. The linear member 220 may be made integral with the arm 55, or it may be attached to the arm 55. For example, the arm 55 may include an auxiliary arm through-hole 230 extending through the arm 55 between the first arm face 59 and the second arm face 61, and the linear member 220 may be inserted into and extend through the auxiliary arm through-hole 230 on both the first arm side 60 and the second arm side 62. The linear member 220 also has an outer linear member surface 226 that is adjacent one or both of the first and second linear member ends 222, 224, and optionally may extend along the entire outer surface of the linear member 220 between the first and second linear member ends 222.

FIGS. 25A-D illustrate a sequence of schematic cross-sectional side views of the bar lobe 210 making contact with the outer linear member surface 226 of the linear member 220. In FIG. 25A, the arm 55 has been moved forward in the negative pitch rotational direction NP, but no contact has been made between the outer linear member surface 226 and the bar lobe 210. Then the arm 55 continues to move forward until the outer linear member surface 226 successively makes contact with the first ramp surface 216 (FIG. 25B), then the bar lobe peak 214 (FIG. 25C), and then the second ramp surface 218 (FIG. 25D).

When the linear member 220 and bar lobe 210 are positioned as shown in FIG. 25B, the outer linear member surface 226 initiates contact with the bar lobe 210 at the first ramp surface 216, and more specifically at a second contact point 240 between the outer linear member surface 226 and the first ramp surface 216. This initiation of contact between the outer linear member surface 226 and the bar lobe 210 also initiates the exertion of a bending load BL by the bar lobe 210 upon the linear member 220. As the arm 55 continues to move forward, the second upper bar end $72_U$ continues to rotate in the rotationally forward negative pitch rotational direction NP; this causes the bending load BL to increase, which in turn causes the linear member 220 to bend and deflect outward from the bending load BL. The bending load BL on the linear member 220 reaches a maximum when the outer linear member surface 226 makes contact with the bar lobe peak 214, as shown in FIG. 25C.

As the arm 55 continues moving toward the forward position FP, the outer linear member surface 226 continues its contact with the bar lobe 210. When the arm 55 has finally reached the forward position FP, the outer linear member surface 226 comes to rest against the second ramp surface 218, as shown in FIG. 25D. In this position, the bending load BL upon the linear member 220 is less than it is in the position shown in FIG. 25C; however, the bending load BL provided by the arrangement shown in FIG. 25D helps keep the arm 55 in the forward position FP during flight despite air resistance pushing aftward against the aircraft wing slat 19 (and thus also aftward against the arm 55). Additionally, frictional resistance FR between the outer linear member surface 226 and the second ramp surface 218 in the forward position FP also urges the arm 55 to remain in the forward position FP.

When the arm 55 is moved from the forward position FP to the aftward position AP, the bending load BL increases as the arrangement of the outer linear member surface 226 and bar lobe 210 moves from the arrangement shown in FIG. 25D to the arrangement shown in FIG. 25C. Then as the arrangement moves from that shown in FIG. 25C to those shown successively in FIG. 25B and then FIG. 25A, the bending load BL decreases and then is released from the linear member 220.

Returning once again to the drawings, the block diagrams of FIGS. 26-29 show that various arm connection points 66, 67, 68, 69 and rib connection points 29, 30, 49, 50 may be: (i) circular bosses 35 coupled with circular dog bone ends 76, and/or (ii) through-holes 33, 34, 53, 54, $66_{th}$, $68_{th}$ coupled with corresponding cross-members 36, 37, 38, 39. These connection relationships are shown in more specificity in TABLE 1 below, where "CP" stands for "connection point", "CB" stands for "circular boss", "TH" stands for "through-hole", "CDBE" stands for "circular dog bone end", and "CM" stands for "cross-member".

TABLE 1

Connection Relationships between Arm and Rib Connection Points and Bar Upper and Lower Ends

| Arm CP | CB or TH | CDBE and/or CM | Bar Upper End | Bar Lower End | CDBE and/or CM | CB or TH | Rib CP |
|---|---|---|---|---|---|---|---|
| 66 | 35 | 76 | $72_U$ | $72_L$ | 76 | 35 | 30 |
| 67 | 35 | 76 | $74_U$ | $74_L$ | 76 | 35 | 50 |
| 68 | 35 | 76 | $71_U$ | $71_L$ | 76 | 35 | 29 |
| 69 | 35 | 76 | $73_U$ | $73_L$ | 76 | 35 | 49 |
| 66 | $66_{th}$ | 37, 76 | $72_U$ | $72_L$ | 39, 76 | 34 | 30 |
| 67 | $66_{th}$ | 37, 76 | $74_U$ | $74_L$ | 39, 76 | 54 | 50 |
| 68 | $68_{th}$ | 36, 76 | $71_U$ | $71_L$ | 38, 76 | 33 | 29 |
| 69 | $68_{th}$ | 36, 76 | $73_U$ | $73_L$ | 38, 76 | 53 | 49 |

As described in more detail below, the first four rows underneath the header of TABLE 1 relate to FIGS. 26-27 (see also FIG. 5), while the last four rows relate to FIGS. 28-29 (see also FIG. 4).

Figure 26:
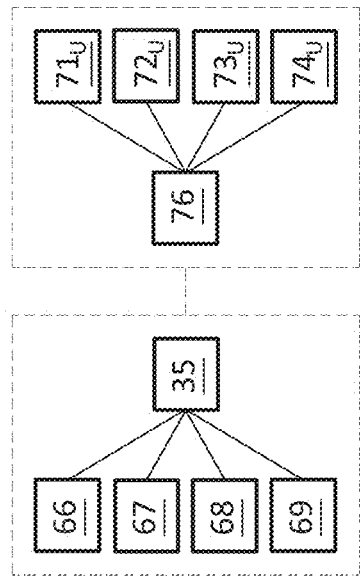
FIG. 26 is a block diagram illustrating that various arm connection points may be circular bosses which couple with corresponding circular dog bone ends on the upper ends of the first through fourth bars.

FIG. 26 shows a block diagram illustrating that various arm connection points 66, 67, 68, 69 may be circular bosses 35 on the arm 55 which couple with corresponding circular dog bone ends 76 on the upper ends $71_U$, $72_U$, $73_U$, $74_U$ of the first through fourth bars 71, 72, 73, 74. For example, the first aftward arm connection point 66 on the arm 55 may be configured as a circular boss 35, and the second first bar upper end $72_U$ may be configured as a circular dog bone end 76 which fits and rotatably connects with the circular boss-shaped first aftward arm connection point 66. Similarly, the second aftward arm connection point 67, the first middle arm connection point 68 and the second middle arm connection point 69 may each be configured as a circular boss 35, while the corresponding fourth bar upper end $74_U$, first bar upper bar end $71_U$, and third bar upper end $73_U$ may be configured as circular dog bone ends 76 which fit and rotatably connect with respective ones of these circular boss-shaped arm connection points 67, 68, 69.

Figure 27:
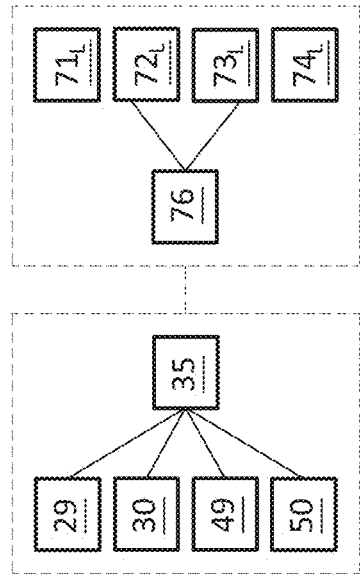
FIG. 27 is a block diagram illustrating that various rib connection points may be circular bosses which couple with corresponding circular dog bone ends on the lower ends of the first through fourth bars.

FIG. 27 shows a block diagram illustrating that various rib connection points 29, 30, 49, 50 may be circular bosses 35 on the first and second ribs 20, 40 which couple with corresponding circular dog bone ends 76 on the lower ends $71_L$, $72_L$, $73_L$, $74_L$ of the first through fourth bars 71, 72, 73, 74. For example, the forward first rib connection point 29 on the first rib 20 may be configured as a circular boss 35, and the first bar lower end $71_L$ may be configured as a circular dog bone end 76 which fits and rotatably connects with the circular boss-shaped forward first rib connection point 29. Similarly, the aftward first rib connection point 30, the forward second rib connection point 49 and the aftward second rib connection point 50 may each be configured as a circular boss 35, while the corresponding second bar lower end $72_L$, third bar lower bar end $73_L$, and fourth bar lower end $74_L$ may be configured as circular dog bone ends 76 which fit and rotatably connect with respective ones of these circular boss-shaped rib connection points 30, 49, 50.

Figure 28:
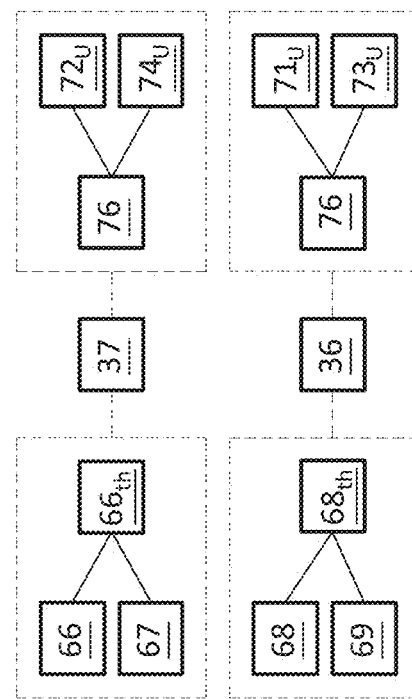
FIG. 28 is a block diagram illustrating that various arm connection points may be through-holes which couple with corresponding cross-members.

FIG. 28 shows a block diagram illustrating that various arm connection points 66, 67, 68, 69 may be through-holes $66_{th}$, $68_{th}$ through the arm 55 which couple with the upper ends $71_U$, $72_U$, $73_U$, $74_U$ of the first through fourth bars 71, 72, 73, 74 via corresponding cross-members 36, 37. For example, the first aftward arm connection point 66 on the arm 55 may be configured as an aftward arm through-hole $66_{th}$, and the second bar upper end $72_U$ may be configured as a circular dog bone end 76, with a second cross-member 37 fitting and rotatably connecting with both the aftward arm through-hole $66_{th}$ and the second bar upper end $72_U$. (That is, the second cross-member 37 rotatably connects the aftward arm through-hole $66_{th}$ with the second bar upper end $72_U$.) Similarly, the second aftward arm connection point 67 may also be configured as an aftward arm through-hole $66_{th}$ (i.e., the aftward arm through-hole $66_{th}$ may serve as both the first and second aftward arm connection points 66, 67), and the fourth bar upper end $74_U$ may be configured as a circular dog bone end 76, with the second cross-member 37 fitting and rotatably connecting with both the aftward arm through-hole $66_{th}$ and the fourth bar upper end $74_U$. (That is, the second cross-member 37 rotatably connects the aftward arm through-hole $66_{th}$ with the fourth bar upper end $74_U$.) Further, the first middle arm connection point 68 and the second middle arm connection point 69 may each be configured as a middle arm through-hole $68_{th}$ (i.e., the middle arm through-hole $68_{th}$ may serve as both the first and second middle arm connection points 68, 69), and the first and third bar upper ends $71_U$, $73_U$ may each be configured as a circular dog bone end 76, with a first cross-member 36 fitting and rotatably connecting with the middle arm through-hole $68_{th}$ and with the first and third bar upper ends $71_U$, $73_U$. (That is, the first cross-member 36 rotatably connects the middle arm through-hole $68_{th}$ with the first and third bar upper ends $71_U$, $73_U$.)

Figure 29:
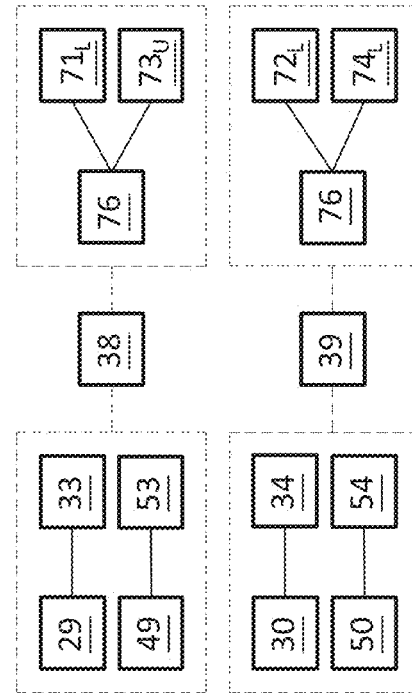
FIG. 29 is a block diagram illustrating that various rib connection points may be through-holes which couple with corresponding cross-members.

FIG. 29 shows a block diagram illustrating that various rib connection points 29, 30, 49, 50 may be through-holes 33, 34, 53, 54 through the first and second ribs 20, 40 which couple with the lower ends $71_L$, $72_L$, $73_L$, $74_L$ of the first through fourth bars 71, 72, 73, 74 via corresponding cross-members 38, 39. For example, the forward first rib connection point 29 on the first rib 20 may be configured as a forward first rib through-hole 33, and the first bar lower end $71_L$ may be configured as a circular dog bone end 76, with a third cross-member 38 fitting and rotatably connecting with both the forward first rib through-hole 33 and the first bar lower end $71_L$. (That is, the third cross-member 38 rotatably connects the forward first rib through-hole 33 with the first bar lower end $71_L$.) Similarly, the forward second rib connection point 49 on the second rib 40 may be configured as a forward second rib through-hole 53, and the third bar lower end $73_L$ may be configured as a circular dog bone end 76, with the third cross-member 38 fitting and rotatably connecting with both the forward second rib through-hole 53 and the third bar lower end $73_L$. (That is, the third cross-member 38 rotatably connects the forward second rib through-hole 53 with the third bar lower end $73_L$.) Further, the aftward first rib connection point 30 may be configured as an aftward first rib through-hole 34 and the aftward second rib connection point 50 may be configured as an aftward second rib through-hole 54, and the second and fourth bar lower ends $72_L$, $74_L$ may each be configured as a circular dog bone end 76, with a fourth cross-member 39 fitting and rotatably connecting with the aftward first and second rib through-holes 34, 54 and with the second and fourth bar lower ends $72_L$, $74_L$. (That is, the fourth cross-member 39 rotatably connects the aftward first and second rib through-holes 34, 54 with the second and fourth bar lower ends $72_L$, $74_L$.)

As noted above, the mechanism 100, 200, 300 of the present disclosure may be arranged in various different but related embodiments.

According to the first embodiment, a mechanism 100 for moving a slat 19 of an aircraft wing 12 of an aircraft 10, wherein the aircraft 10 defines forward, aftward, upward, downward and lateral directions F, A, U, D, L, includes: (i) a first rib 20 having a first rib face 21 on a first rib side 22, a forward first rib connection point 29 on the first rib side 22 and an aftward first rib connection point 30 on the first rib side 22; (ii) a generally elongate arm 55 disposed generally parallel with the first rib 20 on the first rib side 22, the arm 55 having a first arm face 59 on a first arm side 60 facing the first rib face 21, a forward arm connection point 65 at a forward arm end 56, a first aftward arm connection point 66 on the first arm side 60 at an aftward arm end 57, and a first middle arm connection point 68 on the first arm side 60 at a middle arm portion 58 between the forward and aftward arm ends 56, 57; (iii) a first bar 71 having a first bar upper end $71_U$ rotatably attached to the arm 55 at the first middle arm connection point 68 and a first bar lower end $71_L$ rotatably attached to the first rib 20 at the forward first rib connection point 29; (iv) a second bar 72 having a second bar upper end $72_U$ rotatably attached to the arm 55 at the first aftward arm connection point 66 and a second bar lower end $72_L$ rotatably attached to the first rib 20 at the aftward first rib connection point 30; (v) a first extend stop 80 disposed on the first rib face 21; and (vi) a first standoff 84 disposed on the first arm face 59. The first rib 20, the arm 55 and the first and second bars 71, 72 cooperate to form a first four-bar linkage 98, wherein the first and second bars 71, 72 are rotatable about their respective forward and aftward first rib connection points 29, 30 in a negative pitch rotational direction NP until the first standoff 84 contacts the first extend stop 80, thereby disposing the arm 55 in a deployed position DP, and in a positive pitch rotational direction PP until the first standoff 84 is moved away from the first extend stop 80 by a first predetermined amount 77, thereby disposing the arm 55 in a retracted position RP, wherein one of the first extend stop 80 and the first standoff 84 is magnetic M, and the other of the first extend stop 80 and the first standoff 84 is magnetic or ferromagnetic FM.

Magnetic attraction MA between the first extend stop 80 and the first standoff 84 in the deployed position DP may urge the arm 55 to remain in the deployed position DP.

The mechanism 100 may further include an aircraft wing slat 19 attached to the forward arm connection point 65.

The first extend stop 80 may be magnetic M and may have a first polarity $P_1$, and the first standoff 84 may be magnetic M and may have a second polarity $P_2$ that is opposite the first polarity $P_1$. Alternatively, one of the first extend stop 80 and the first standoff 84 may be magnetic M, and the other of the first extend stop 80 and the first standoff 84 may be ferromagnetic FM.

At least one of the first middle arm connection point 68 and the first aftward arm connection point 66 may be a circular boss 35 protruding outward from the first arm face 59, and at least one of the first bar upper end $71_U$ and the second bar upper end $72_U$ may be a circular dog bone end 76. Additionally or alternatively, at least one of the forward first rib connection point 29 and the aftward first rib connection point 30 may be a circular boss 35 protruding outward from the first rib face 21, and at least one of the first bar lower end $71_L$ and the second bar lower end $72_L$ may be a circular dog bone end 76.

At least one of the first middle arm connection point 68 and the first aftward arm connection point 66 may be a circular through-hole $68_{th}$, $66_{th}$ extending through the arm 55 and may have a respective cross-member 36, 37 disposed therethrough. Additionally or alternatively, at least one of the forward first rib connection point 29 and the aftward first rib connection point 30 may be a circular through-hole 33, 34 extending through the first rib 20 and may have a respective cross-member 38, 39 disposed therethrough.

The arm 55 may have a second arm face 61 on a second arm side 62 opposite the first arm side 60, a second aftward arm connection point 67 on the second arm side 62 at the aftward arm end 57, and a second middle arm connection point 69 on the second arm side 62 at the middle arm portion 58, and the mechanism 100 may further include: (vii) a second rib 40 having a second rib face 41 on a second rib side 42, a forward second rib connection point 49 on the second rib side 42 and an aftward second rib connection point 50 on the second rib side 42, wherein the second rib face 41 faces toward the first rib face 21 and the arm 55 is disposed between the first and second ribs 20, 40; (viii) a third bar 73 having a third bar upper end $73_U$ rotatably attached to the arm 55 at the second middle arm connection point 69 and a third bar lower end $73_L$ rotatably attached to the second rib 40 at the forward second rib connection point 49; and (ix) a fourth bar 74 having a fourth bar upper end $74_U$ rotatably attached to the arm 55 at the second aftward arm connection point 67 and a fourth bar lower end $74_L$ rotatably attached to the second rib 40 at the aftward second rib connection point 50. In this arrangement, the second rib 40, the arm 55 and the third and fourth bars 73, 74 may cooperate to form a second four-bar linkage 99, wherein the third and fourth bars 73, 74 are rotatable about their respective forward and aftward second rib connection points 49, 50 in the negative and positive pitch rotational directions NP, PP in concert with the first four-bar linkage 98.

According to the second embodiment, a mechanism 200 for moving a slat 19 of an aircraft wing 12 of an aircraft 10, wherein the aircraft 10 defines forward, aftward, upward, downward and lateral directions F, A, U, D, L, includes: (i) a first rib 22 having a first rib face 21 on a first rib side 22, an outer first rib face 23 on an outer first rib side 24 opposite the first rib side 22, a forward first rib connection point 29 on the first rib side 22, an aftward first rib connection point 30 on the first rib side 22, an outer first rib connection point 150 on the outer first rib side 24, and a first rib opening 118 extending through the first rib 20; (ii) a second rib 40 having a second rib face 41 on a second rib side 42, an outer second rib face 43 on an outer second rib side 44 opposite the second rib side 42, a forward second rib connection point 49 on the second rib side 42, an aftward second rib connection point 50 on the second rib side 42, an outer second rib connection point 160 on the outer second rib side 44, and a second rib opening 119 extending through second rib 40, wherein the second rib face 41 faces toward and is generally parallel with the first rib face 21; (iii) a generally elongate arm 55 disposed generally parallel with and between the first and second ribs 20, 40, the arm 55 having a first arm face 59 on a first arm side 60 facing the first rib face 21, a second arm face 61 on a second arm side 62 facing the second rib face 41, a bottom arm face 64, a forward arm connection point 65 at a forward arm end 56, a first aftward arm connection point 66 on the first arm side 60 at an aftward arm end 57, a second aftward arm connection point 67 on the second arm side 62 at the aftward arm end 57, a first middle arm connection point 68 on the first arm side 60 at a middle arm portion 58 between the forward and aftward arm ends 56, 57, a second middle arm connection point 69 on the second arm side 62 at the middle arm portion 58, and an arm lobe 110 extending downward from the bottom arm face 64 and having an arm lobe peak 112, a forward ramp surface 114 forward of the arm lobe peak 112 and an aftward ramp surface 116 aftward of the arm lobe peak 112, wherein the bottom arm face 64 has a landing portion 64L thereof adjacent the aftward ramp surface 116; (iv) a first bar 71 having a first bar upper end $71_U$ rotatably attached to the arm 55 at the first middle arm connection point 68 and a first bar lower end $71_L$ rotatably attached to the first rib 20 at the forward first rib connection point 29; (v) a second bar 72 having a second bar upper end $72_U$ rotatably attached to the arm 55 at the first aftward arm connection point 66 and a second bar lower end $72_L$ rotatably attached to the first rib 20 at the aftward first rib connection point 30; (vi) a third bar 73 having a third bar upper end $73_U$ rotatably attached to the arm 55 at the second middle arm connection point 69 and a third bar lower end $73_L$ rotatably attached to the second rib 40 at the forward second rib connection point 49; (vii) a fourth bar 74 having a fourth bar upper end $74_U$ rotatably attached to the arm 55 at the second aftward arm connection point 67 and a fourth bar lower end $74_L$ rotatably attached to the second rib 40 at the aftward second rib connection point 50; (viii) a cross-bolt 120 having a first cross-bolt end 122 extending through the first rib opening 118, a second cross-bolt end 124 extending through the second rib opening 119 and an outer cross-bolt surface 126 between the first and second cross-bolt ends 122, 124; (ix) a first biasing member 130 having a first biasing member upper end 132 attached to the outer first rib connection point 150 and a first biasing member lower end 134 attached to the first cross-bolt end 122; and (x) a second biasing member 140 having a second biasing member upper end 142 attached to the outer second rib connection point 160 and a second biasing member lower end 144 attached to the second cross-bolt end 124. The first rib 20, the arm 55 and the first and second bars 71, 72 cooperate to form a first four-bar linkage 98 and the second rib 40, the arm 55 and the third and fourth bars 73, 74 cooperate to form a second four-bar linkage 99, wherein the first and second bars 71, 72 are rotatable about their respective forward and aftward first rib connection points 29, 30 and the third and fourth bars 73, 74 are rotatable about their respective forward and aftward second rib connection points 49, 50 in a negative pitch rotational direction NP until the outer cross-bolt surface 126 successively contacts the forward ramp surface 114, the arm lobe peak 112, the aftward ramp surface 116 and the landing portion 64L, thereby disposing the arm 55 in an extended position EP, and in a positive pitch rotational direction PP until the outer cross-bolt surface 126 successively contacts the landing portion 64L, the aftward ramp surface 116, the arm lobe peak 112 and the forward ramp surface 114, thereby disposing the arm 55 in a default position XP.

Frictional resistance FR between the outer cross-bolt surface 126 and the aftward ramp surface 116 in the extended position EP may urge the arm 55 to remain in the extended position EP. Movement of the arm 55 from the default position XP to the extended position EP may cause the first and second biasing members 130, 140 to extend as the outer cross-bolt surface 126 successively contacts the forward ramp surface 114 and the arm lobe peak 112 and to retract as the outer cross-bolt surface 126 successively contacts the aftward ramp surface 116 and the landing portion 64L.

According to the third embodiment, a mechanism 300 for moving a slat 19 of an aircraft wing 12 of an aircraft 10, wherein the aircraft 10 defines forward, aftward, upward, downward and lateral directions F, A, U, D, L, includes: (i) a first rib 22 having a first rib face 21 on a first rib side 22, a forward first rib connection point 29 on the first rib side 22 and an aftward first rib connection point 30 on the first rib side 22; (ii) a generally elongate arm 55 disposed generally parallel with the first rib 20 on the first rib side 22, the arm 55 having a first arm face 59 on a first arm side 60 facing the first rib face 21, a forward arm connection point 65 at a forward arm end 56, a first aftward arm connection point 66 on the first arm side 60 at an aftward arm end 57, and a first middle arm connection point 68 on the first arm side 60 at a middle arm portion 58 between the forward and aftward arm ends 56, 57; (iii) a first bar 71 having a first bar upper end 71$_U$ rotatably attached to the arm 55 at the first middle arm connection point 68 and a first bar lower end 71$_L$ rotatably attached to the first rib 20 at the forward first rib connection point 29; (iv) a second bar 72 having a second bar upper end 72$_U$ rotatably attached to the arm 55 at the first aftward arm connection point 66 and a second bar lower end 72$_L$ rotatably attached to the first rib 20 at the aftward first rib connection point 30; (v) a bar lobe 210 extending radially outward from a circumferential cam surface 212 on the first bar upper end 71$_U$ or the second bar upper end 72$_U$, wherein the circumferential cam surface 212 defines a rotationally forward negative pitch rotational direction NP and a rotationally aftward positive pitch rotational direction PP, and wherein the bar lobe 210 has a bar lobe peak 214, a first ramp surface 216 on a rotationally forward side 217 of the bar lobe peak 210 and a second ramp surface 218 on a rotationally aftward side 219 of the bar lobe peak 210; and (vi) a linear member 220 disposed at least partially on the first arm side 60 and having a first linear member end 222 extending outward from the first arm face 59 and an outer linear member surface 226 adjacent the first linear member end 222. The first rib 20, the arm 55 and the first and second bars 71, 72 cooperate to form a first four-bar linkage 98, wherein the first and second bars 71, 72 are rotatable about their respective forward and aftward first rib connection points 29, 30 in the negative pitch rotational direction NP until the outer linear member surface 226 successively contacts the first ramp surface 216, the bar lobe peak 214 and the second ramp surface 218, thereby disposing the arm 55 in a forward position FP, and in the positive pitch rotational direction PP until the outer linear member surface 226 successively contacts the second ramp surface 218, the bar lobe peak 214 and the first ramp surface 216, thereby disposing the arm in an aftward position AP.

Frictional resistance FR between the outer linear member surface 226 and the second ramp surface 218 in the forward position FP may urge the arm 55 to remain in the forward position FP.

Movement of the arm 55 from the aftward position AP to the forward position FP may exert a bending load BL on the linear member 220 as the outer linear member surface 226 successively contacts the first ramp surface 216, the bar lobe peak 214 and the second ramp surface 218, and movement of the arm 55 from the forward position FP to the aftward position AP may release the bending load BL from the linear member 220 as the outer linear member surface 226 successively contacts the second ramp surface 218, the bar lobe peak 214 and the first ramp surface 216.

The mechanism 300 may further include an aircraft wing slat 19 attached to the forward arm connection point 65.

The arm 55 may have a second arm face 61 on a second arm side 62 opposite the first arm side 60, a second aftward arm connection point 67 on the second arm side 62 at the aftward arm end 57, and a second middle arm connection point 69 on the second arm side 62 at the middle arm portion 58, with the mechanism 300 further including: (vii) a second rib 40 having a second rib face 41 on a second rib side 42, a forward second rib connection point 49 on the second rib side 42 and an aftward second rib connection point 50 on the second rib side 42, wherein the second rib face 41 faces toward the first rib face 21 and the arm 55 is disposed between the first and second ribs 20, 40; (viii) a third bar 73 having a third bar upper end 73$_U$ rotatably attached to the arm 55 at the second middle arm connection point 69 and a third bar lower end 73$_L$ rotatably attached to the second rib 40 at the forward second rib connection point 49; and (ix) a fourth bar 74 having a fourth bar upper end 74$_U$ rotatably attached to the arm 55 at the second aftward arm connection point 67 and a fourth bar lower end 74$_L$ rotatably attached to the second rib 40 at the aftward second rib connection point 50. In this arrangement, the second rib 40, the arm 55 and the third and fourth bars 73, 74 may cooperate to form a second four-bar linkage 99, wherein the third and fourth bars 73, 74 are rotatable about their respective forward and aftward second rib connection points 49, 50 in the negative and positive pitch rotational directions NP, PP in concert with the first four-bar linkage 98.

The arm 55 may include an auxiliary arm through-hole 230 and the linear member 220 may extend through the auxiliary arm through-hole 230. The linear member 220 may be further disposed at least partially on the second arm side 62 and may have a second linear member end 224 extending outward from the second arm face 61.

According to a further embodiment, a mechanism 100 for moving a slat 19 of an aircraft wing 12 of an aircraft 10, wherein the aircraft 10 defines forward, aftward, upward, downward and lateral directions F, A, U, D, L, includes: (i) a first rib 22 having a first rib face 21 on a first rib side 22, a forward first rib connection point 29 on the first rib side 22 and an aftward first rib connection point 30 on the first rib side 22; (ii) a second rib 40 having a second rib face 41 on a second rib side 42, a forward second rib connection point 49 on the second rib side 42 and an aftward second rib connection point 50 on the second rib side 42, wherein the second rib 40 face faces toward the first rib face 21; (iii) a generally elongate arm 55 disposed generally parallel with and between the first and second ribs 20, 40, the arm 55 having a first arm face 59 on a first arm side 60 facing the first rib face 21, a second arm face 61 on a second arm side 62 facing the second rib face 41, a bottom arm face 64, a forward arm connection point 65 at a forward arm end 56, a first aftward arm connection point 66 on the first arm side 60 at an aftward arm end 57, a second aftward arm connection point 67 on the second arm side 62 at the aftward arm end 57, a first middle arm connection point 68 on the first arm side 60 at a middle arm portion 58 between the forward and aftward arm ends 56, 57, and a second middle arm connection point 69 on the second arm side 62 at the middle arm portion 58; (iv) a first bar 71 having a first bar upper end 71$_U$ rotatably attached to the arm 55 at the first middle arm connection point 68 and a first bar lower end 71$_L$ rotatably attached to the first rib 20 at the forward first rib connection point 29; (v) a second bar 72 having a second bar upper end 72$_U$ rotatably attached to the arm 55 at the first aftward arm connection 66 point and a second bar lower end 72$_L$ rotatably attached to the first rib 20 at the aftward first rib connection point 30; (vi) a third bar 73 having a third bar upper end 73$_U$ rotatably attached to the arm 55 at the second middle arm connection point 69 and a third bar lower end 73$_L$ rotatably attached to the second rib 40 at the forward second rib connection point 49; (vii) a fourth bar 74 having a fourth bar upper end 74$_U$ rotatably attached to the arm 55 at the second aftward arm connection point 67 and a fourth bar lower end 74$_L$ rotatably attached to the second rib 40 at the aftward second rib connection point 50; (viii) a first extend stop 80 disposed on the first rib face 21; and (ix) a first standoff 84 disposed on the first arm face 59. The first rib 20, the arm 55 and the first and second bars 71, 72 cooperate to form a first four-bar linkage 98 and the second rib 40, the arm 55 and the third and fourth bars 73, 74 cooperate to form a second four-bar linkage 99, wherein the first and second bars 71, 72 are rotatable about their respective forward and aftward first rib connection points 29, 30 and the third and fourth bars 73, 74 are rotatable about their respective forward and aftward second rib connection points 49, 50 in a negative pitch rotational direction NP until the first standoff 84 contacts the first extend stop 80, thereby disposing the arm 55 in a deployed position DP, and in an positive pitch rotational direction PP until the first standoff 84 is moved away from the first extend stop 80 by a first predetermined amount 77, thereby disposing the arm 55 in a retracted position RP, wherein one of the first extend stop 80 and the first standoff 84 is magnetic M, and the other of the first extend stop 80 and the first standoff 84 is magnetic M or ferromagnetic FM.

According to yet a further embodiment, a mechanism 300 for moving a slat 19 of an aircraft wing 12 of an aircraft 10, wherein the aircraft 10 defines forward, aftward, upward, downward and lateral directions F, A, U, D, L, includes: (i) a first rib 22 having a first rib face 21 on a first rib side 22, a forward first rib connection point 29 on the first rib side 22 and an aftward first rib connection point 30 on the first rib side 22; (ii) a second rib 40 having a second rib face 41 on a second rib side 42, a forward second rib connection point 49 on the second rib side 42 and an aftward second rib connection point 50 on the second rib side 42, wherein the second rib face 41 faces toward the first rib face 21; (iii) a generally elongate arm 55 disposed generally parallel with and between the first and second ribs 20, 40 on the first rib side 22, the arm 55 having a first arm face 59 on a first arm side 60 facing the first rib face 21, a second arm face 61 on a second arm side 62 facing the second rib face 41, a forward arm connection point 65 at a forward arm end 56, a first aftward arm connection point 66 on the first arm side 60 at an aftward arm end 57, a second aftward arm connection point 67 on the second arm side 62 at the aftward arm end 57, a first middle arm connection point 68 on the first arm side 60 at a middle arm portion 58 between the forward and aftward arm ends 56, 57, a second middle arm connection point 69 on the second arm side 62 at the middle arm portion 58, and an auxiliary arm through-hole 230; (iv) a first bar 71 having a first bar upper end $71_U$ rotatably attached to the arm 55 at the first middle arm connection point 68 and a first bar lower end $71_L$ rotatably attached to the first rib 20 at the forward first rib connection point 29; (v) a second bar 72 having a second bar upper end $72_U$ rotatably attached to the arm 55 at the first aftward arm connection point 66 and a second bar lower end $72_L$ rotatably attached to the first rib 20 at the aftward first rib connection point 30; (vi) a third bar 73 having a third bar upper end $73_U$ rotatably attached to the arm 55 at the second middle arm connection point 69 and a third bar lower end $73_L$ rotatably attached to the second rib 40 at the forward second rib connection point 49; (vii) a fourth bar 74 having a fourth bar upper end $74_U$ rotatably attached to the arm 55 at the second aftward arm connection point 67 and a fourth bar lower end $74_L$ rotatably attached to the second rib 40 at the aftward second rib connection point 50; (viii) a bar lobe 210 extending radially outward from a circumferential cam surface 212 on the first bar upper end $71_U$ or the second bar upper end $72_U$, wherein the circumferential cam surface 212 defines a rotationally forward negative pitch rotational direction NP and a rotationally aftward positive pitch rotational direction PP, and wherein the bar lobe 210 has a bar lobe peak 214, a first ramp surface 216 on a rotationally forward side 217 of the bar lobe peak 210 and a second ramp surface 218 on a rotationally aftward side 219 of the bar lobe peak 210; and (ix) a linear member 220 disposed within the auxiliary arm through-hole 230 and having a first linear member end 222 extending outward from the first arm face 59, a second linear member end 224 extending outward from the second arm face 61 and an outer linear member surface 226 between the first and second linear member ends 222, 224. The first rib 20, the arm 55 and the first and second bars 71, 72 cooperate to form a first four-bar linkage 98 and the second rib 40, the arm 55 and the third and fourth bars 73, 74 cooperate to form a second four-bar linkage 99, wherein the first and second bars 71, 72 are rotatable about their respective forward and aftward first rib connection points 29, 30 and the third and fourth bars 73, 74 are rotatable about their respective forward and aftward second rib connection points 49, 50 in the negative pitch rotational direction NP until the outer linear member surface 226 successively contacts the first ramp surface 216, the bar lobe peak 214 and the second ramp surface 218, thereby disposing the arm 55 in a forward position FP, and in the positive pitch rotational direction PP until the outer linear member surface 226 successively contacts the second ramp surface 218, the bar lobe peak 214 and the first ramp surface 216, thereby disposing the arm 55 in an aftward position AP.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A mechanism for moving a slat of an aircraft wing of an aircraft, wherein the aircraft defines forward, aftward, upward, downward and lateral directions, comprising:
  a first rib having a first rib face on a first rib side, a forward first rib connection point on the first rib side and an aftward first rib connection point on the first rib side;
  a generally elongate arm disposed generally parallel with the first rib on the first rib side, the arm having a first arm face on a first arm side facing the first rib face, a forward arm connection point at a forward arm end, a first aftward arm connection point on the first arm side at an aftward arm end, and a first middle arm connection point on the first arm side at a middle arm portion between the forward and aftward arm ends;

a first bar having a first bar upper end rotatably attached to the arm at the first middle arm connection point and a first bar lower end rotatably attached to the first rib at the forward first rib connection point;

a second bar having a second bar upper end rotatably attached to the arm at the first aftward arm connection point and a second bar lower end rotatably attached to the first rib at the aftward first rib connection point;

a first extend stop disposed on the first rib face; and a first standoff disposed on the first arm face;

wherein the first rib, the arm and the first and second bars cooperate to form a first four-bar linkage, wherein the first and second bars are rotatable about their respective forward and aftward first rib connection points in a negative pitch rotational direction until the first standoff contacts the first extend stop, thereby disposing the arm in a deployed position, and in a positive pitch rotational direction until the first standoff is moved away from the first extend stop by a first predetermined amount, thereby disposing the arm in a retracted position; and wherein one of the first extend stop and the first standoff is magnetic, and the other of the first extend stop and the first standoff is magnetic or ferromagnetic.

2. The mechanism of claim 1, wherein magnetic attraction between the first extend stop and the first standoff in the deployed position urges the arm to remain in the deployed position.

3. The mechanism of claim 1, further comprising:
an aircraft wing slat attached to the forward arm connection point.

4. The mechanism of claim 1, wherein the first extend stop is magnetic and has a first polarity, and wherein the first standoff is magnetic and has a second polarity that is opposite the first polarity.

5. The mechanism of claim 1, wherein one of the first extend stop and the first standoff is magnetic, and wherein the other of the first extend stop and the first standoff is ferromagnetic.

6. The mechanism of claim 1, wherein at least one of the first middle arm connection point and the first aftward arm connection point is a circular boss protruding outward from the first arm face, and at least one of the first bar upper end and the second bar upper end is a circular dog bone end.

7. The mechanism of claim 1, wherein at least one of the forward first rib connection point and the aftward first rib connection point is a circular boss protruding outward from the first rib face, and at least one of the first bar lower end and the second bar lower end is a circular dog bone end.

8. The mechanism of claim 1, wherein at least one of the first middle arm connection point and the first aftward arm connection point is a circular through-hole extending through the arm and having a respective cross-member disposed therethrough.

9. The mechanism of claim 1, wherein at least one of the forward first rib connection point and the aftward first rib connection point is a circular through-hole extending through the first rib and having a respective cross-member disposed therethrough.

10. The mechanism of claim 1, wherein the arm has a second arm face on a second arm side opposite the first arm side, a second aftward arm connection point on the second arm side at the aftward arm end, and a second middle arm connection point on the second arm side at the middle arm portion, the mechanism further comprising:

a second rib having a second rib face on a second rib side, a forward second rib connection point on the second rib side and an aftward second rib connection point on the second rib side, wherein the second rib face faces toward the first rib face and the arm is disposed between the first and second ribs;

a third bar having a third bar upper end rotatably attached to the arm at the second middle arm connection point and a third bar lower end rotatably attached to the second rib at the forward second rib connection point; and a fourth bar having a fourth bar upper end rotatably attached to the arm at the second aftward arm connection point and a fourth bar lower end rotatably attached to the second rib at the aftward second rib connection point;

wherein the second rib, the arm and the third and fourth bars cooperate to form a second four-bar linkage, wherein the third and fourth bars are rotatable about their respective forward and aftward second rib connection points in the negative and positive pitch rotational directions in concert with the first four-bar linkage.

* * * * *